US012731441B2

(12) United States Patent
Imanishi et al.

(10) Patent No.: US 12,731,441 B2
(45) Date of Patent: Sep. 8, 2026

(54) PERSON AUTHENTICATION SUPPORT SYSTEM, PERSON AUTHENTICATION SUPPORT METHOD, AND NON-TRANSITORY STORAGE MEDIUM

(71) Applicant: NEC Corporation, Tokyo (JP)

(72) Inventors: Yoshiko Imanishi, Tokyo (JP); Yasunari Tsuji, Tokyo (JP)

(73) Assignee: NEC CORPORATION, Tokyo (JP)

(*) Notice: Subject to any disclaimer, the term of this patent is extended or adjusted under 35 U.S.C. 154(b) by 303 days.

(21) Appl. No.: 18/273,149

(22) PCT Filed: Apr. 9, 2021

(86) PCT No.: PCT/JP2021/015012
§ 371 (c)(1),
(2) Date: Jul. 19, 2023

(87) PCT Pub. No.: WO2022/215248
PCT Pub. Date: Oct. 13, 2022

(65) Prior Publication Data
US 2024/0104964 A1 Mar. 28, 2024

(51) Int. Cl.
*G06K 9/00* (2022.01)
*G06T 7/50* (2017.01)
(Continued)

(52) U.S. Cl.
CPC ................ *G06V 40/45* (2022.01); *G06T 7/50* (2017.01); *G06V 40/172* (2022.01); *G06T 2207/30201* (2013.01)

(58) Field of Classification Search
CPC .... G06V 40/45; G06V 40/172; G06V 40/166; G06T 7/50; G06T 2207/30201; G06T 7/00
See application file for complete search history.

(56) References Cited

U.S. PATENT DOCUMENTS

2017/0116745 A1* 4/2017 Yuasa ..................... G06F 18/22
2019/0251334 A1* 8/2019 Kawase ............... G06V 40/168

FOREIGN PATENT DOCUMENTS

CN 104239811 A * 12/2014 ......... G06F 21/6245
EP 1085366 A2 * 3/2001 ............. G03B 17/53
(Continued)

OTHER PUBLICATIONS

Face Localization and Authentication Using Color and Depth Images, Filareti Tsalakanidou et al., IEEE, 2005, pp. 152-168 (Year: 2005).*
(Continued)

*Primary Examiner* — Jayesh A Patel
(74) *Attorney, Agent, or Firm* — Sughrue Mion, PLLC

(57) ABSTRACT

A person authentication support system (100) includes: a measurement condition acquisition unit (112) for acquiring a measurement condition of a depth in a measurement apparatus capable of generating image information indicating an image of a photographing region including a face of a target person, and depth information indicating a depth; a region setting unit (115) for setting a processing region being a region serving as a processing target of the depth information in the photographing region according to the measurement condition; a depth acquisition unit (116) for acquiring depth information including a depth in the processing region being measured in the measurement condition; and a collation determination unit (117) for determining whether image information of the target person is used in collation processing, based on depth information of the processing region.

12 Claims, 22 Drawing Sheets

(51) Int. Cl.
*G06V 40/16* (2022.01)
*G06V 40/40* (2022.01)

(56) References Cited

FOREIGN PATENT DOCUMENTS

| | | | |
|---|---|---|---|
| JP | 2003-208407 | A | 7/2003 |
| JP | 2005-293350 | A | 10/2005 |
| JP | 2007-156541 | A | 6/2007 |
| JP | 2007-241402 | A | 9/2007 |
| JP | 2009-199392 | A | 9/2009 |
| WO | 2018/079031 | A1 | 5/2018 |

OTHER PUBLICATIONS

Effective and precise face detection based on color and depth data, Loris Nanni et al., Elsevier, 2014, pp. 1-13 (Year: 2014).*
Face Liveness Detection using Variable Focusing, Sooyeon Kim et al., IEEE, 2013, pp. 1-6 (Year: 2013).*
Real-time acquisition of depthand color images using structured light and its application to 3D face recognition, Filareti Tsalakanidou et al., Elsevier, 2005, pp. 358-369 (Year: 2005).*
International Search Report for PCT Application No. PCT/JP2021/015012, mailed on Jun. 29, 2021.
JP Official Communication for JP Application No. 2024-045039, mailed on Jan. 21, 2025 with English Translation.

* cited by examiner

MEASUREMENT CONDITION VERSUS ACCURACY DATA

| MEASUREMENT CONDITION INFORMATION | ACCURACY INFORMATION |
| --- | --- |
| A | 150 |
| B | 80 |

Figure 6:
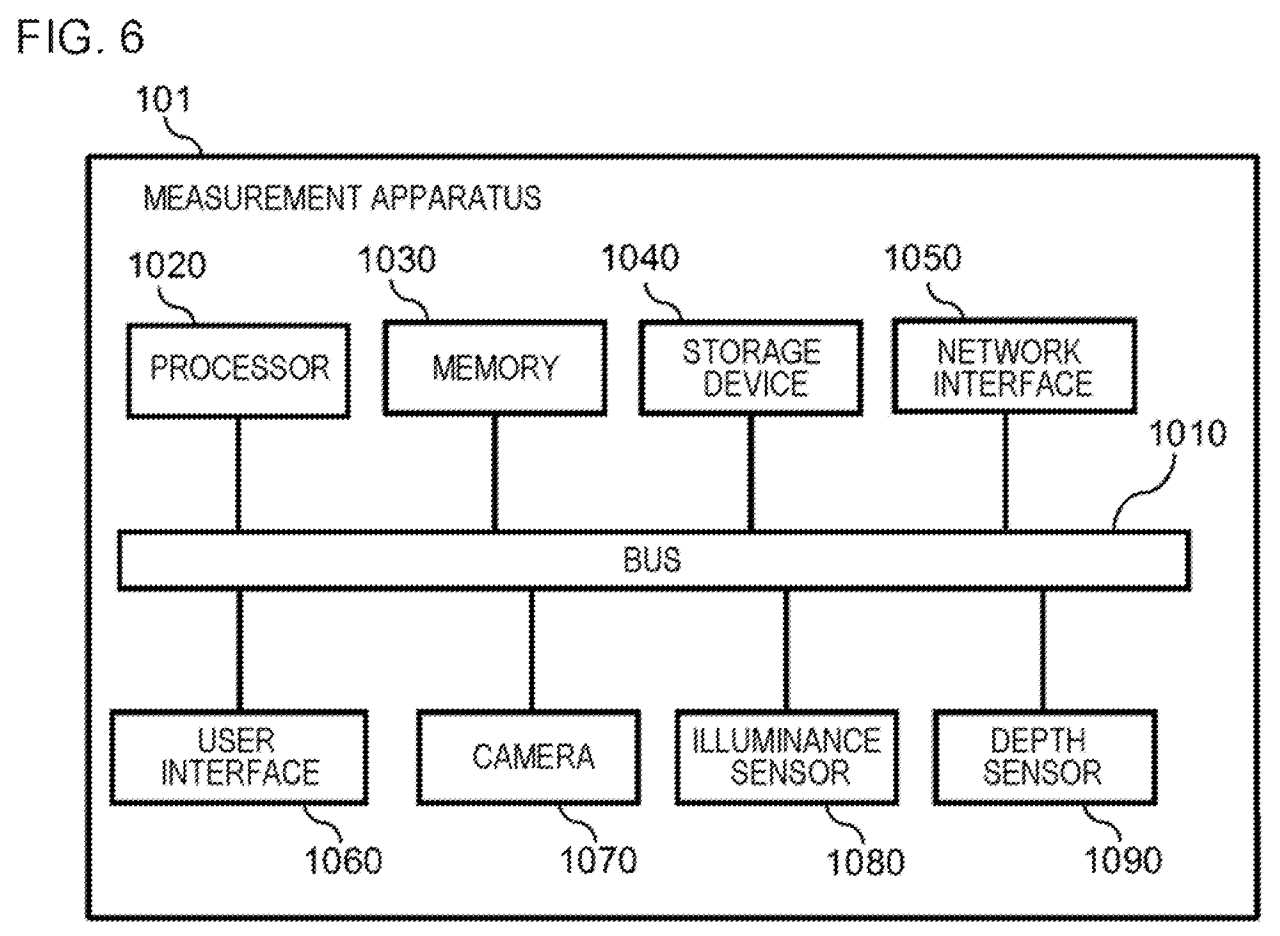

MEASUREMENT APPARATUS

1020 PROCESSOR

1030 MEMORY

1040 STORAGE DEVICE

1050 NETWORK INTERFACE

1010 BUS

1060 USER INTERFACE

1070 CAMERA

1080 ILLUMINANCE SENSOR

1090 DEPTH SENSOR

Figure 7:
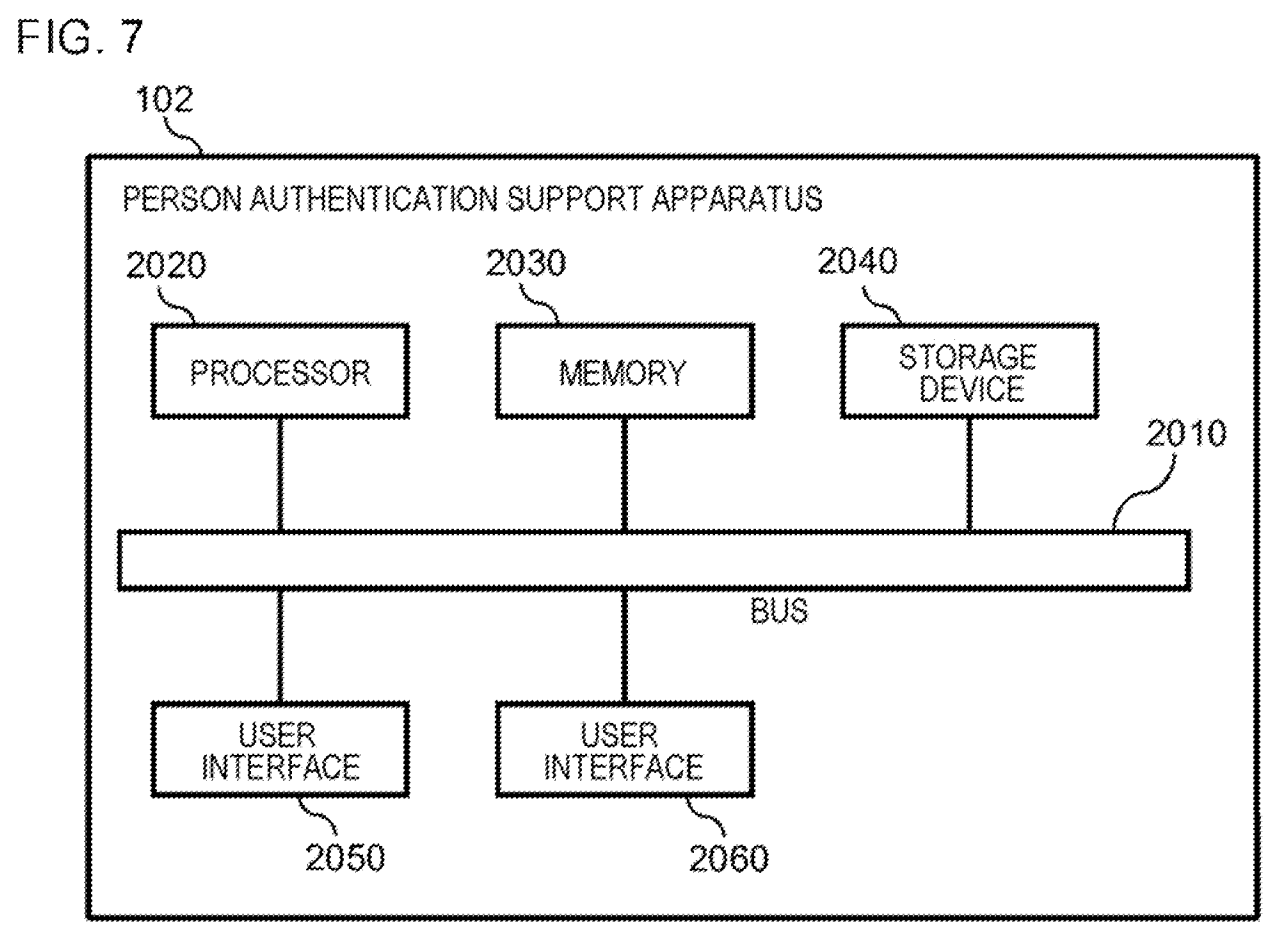

PERSON AUTHENTICATION SUPPORT APPARATUS

2020 PROCESSOR

2030 MEMORY

2040 STORAGE DEVICE

2010 BUS

2050 USER INTERFACE

2060 USER INTERFACE

MEASUREMENT CONDITION VERSUS ACCURACY DATA

| MEASUREMENT CONDITION INFORMATION | ACCURACY INFORMATION |
|---|---|
| A | HIGH |
| B | LOW |

PERSON AUTHENTICATION SUPPORT SYSTEM, PERSON AUTHENTICATION SUPPORT METHOD, AND NON-TRANSITORY STORAGE MEDIUM

This application is a National Stage Entry of PCT/JP2021/015012 filed on Apr. 9, 2021, the contents of all of which are incorporated herein by reference, in their entirety.

TECHNICAL FIELD

The present invention relates to a person authentication support system, a person authentication support method, and a non-transitory storage medium.

BACKGROUND ART

For example, PTL 1 discloses an image processing apparatus, as a technique for authenticating a person. The image processing apparatus described in PTL 1 includes an acquisition unit for acquiring a first image generated by photographing a subject with use of light of a first wavelength, a second image generated by photographing the subject with use of light of a second wavelength, and depth information of the subject; and a detection unit for detecting a face captured in the second image.

Further, the image processing apparatus includes a determination unit for determining whether the face detected by the detection unit is a face acquired by photographing a living body, based on the depth information, and an extraction unit for extracting a face image from the first image, based on information relating to the face being determined to be the face acquired by photographing the living body by the determination unit.

CITATION LIST

Patent Literature

PTL 1: International Publication No. WO2018/079031

SUMMARY OF INVENTION

Technical Problem

According to the technique described in PTL 1, determination is made as to whether a face detected by the detection unit is a face acquired by photographing a living body, based on depth information. However, it is often a case that there is a variation in accuracy of depth information to be generated depending on a measurement apparatus such as a sensor for generating depth information. Therefore, it is not possible to accurately determine whether a face captured in an image is a face acquired by photographing a living body, and accurate person authentication may become difficult.

The present invention has been made in view of the above-described circumstances, and one of objects of the present invention is to support accuracy improvement of person authentication.

Solution to Problem

In order to achieve the above object, a person authentication support system according to a first aspect of the present invention includes:

a measurement condition acquisition means for acquiring a measurement condition of a depth in a measurement apparatus capable of generating image information indicating an image of a photographing region including a face of a target person, and depth information indicating a depth;

a region setting means for setting a processing region being a region serving as a processing target of the depth information in the photographing region according to the measurement condition;

a depth acquisition means for acquiring depth information including a depth in the processing region being measured in the measurement condition; and a collation determination means for determining whether image information of the target person is used in collation processing, based on depth information of the processing region.

In order to achieve the above object, a person authentication support apparatus according to a second aspect of the present invention includes:

a measurement apparatus capable of generating image information indicating an image of a photographing region including a face of a target person, and depth information indicating a depth;

a measurement condition acquisition means for acquiring a measurement condition of a depth in the measurement apparatus;

a region setting means for setting a processing region being a region serving as a processing target of the depth information in the photographing region according the measurement condition; and a collation determination means for determining whether image information of the target person is used in collation processing, based on depth information of the processing region.

A person authentication support method according to a third aspect of the present invention includes, by a computer:

acquiring a measurement condition of a depth in a measurement apparatus capable of generating image information indicating an image of a photographing region including a face of a target person, and depth information indicating a depth;

setting a processing region being a region serving as a processing target of the depth information in the photographing region according to the measurement condition;

acquiring depth information including a depth in the processing region being measured in the measurement condition; and determining whether image information of the target person is used in collation processing, based on depth information of the processing region.

A program according to a fourth aspect of the present invention is a program for causing a computer to execute:

acquiring a measurement condition of a depth in a measurement apparatus capable of generating image information indicating an image of a photographing region including a face of a target person, and depth information indicating a depth;

setting a processing region being a region serving as a processing target of the depth information in the photographing region according to the measurement condition;

acquiring depth information including a depth in the processing region being measured in the measurement condition; and determining whether image information of the target person is used in collation processing, based on depth information of the processing region.

Advantageous Effects of Invention

The present invention enables to support accuracy improvement of person authentication.

BRIEF DESCRIPTION OF DRAWINGS

FIG. 3 is diagram illustrating one example of measurement condition versus accuracy data according to the example embodiment 1.

FIG. 6 is a diagram illustrating an example of a physical configuration of a measurement apparatus according to the example embodiment 1 of the present invention.

FIG. 7 is a diagram illustrating an example of a physical configuration of a person authentication support apparatus according to the example embodiment 1 of the present invention.

FIG. 20 is a diagram illustrating one example of measurement condition versus accuracy data according to a modification example 3.

DESCRIPTION OF EMBODIMENTS

Hereinafter, example embodiments according to the present invention are described with reference to the drawings. Note that, in all drawings, a similar constituent element is indicated by a similar reference sign, and description thereof is omitted as necessary.

Example Embodiment 1

<Configuration of Person Authentication Support System 100>

A person authentication support system 100 according to an example embodiment 1 is a system for supporting person authentication of a target person. In person authentication, information for identifying a target person is confirmed to be information of the target person himself/herself. Person authentication as described above is performed, for example, in processing of handling personal information of a target person at a time when the target person is registered as a member doing transaction in net shopping or the like. Information for identifying a target person in this case is a name, an address, a date of birth, and the like to be input by the target person.

Figure 1:
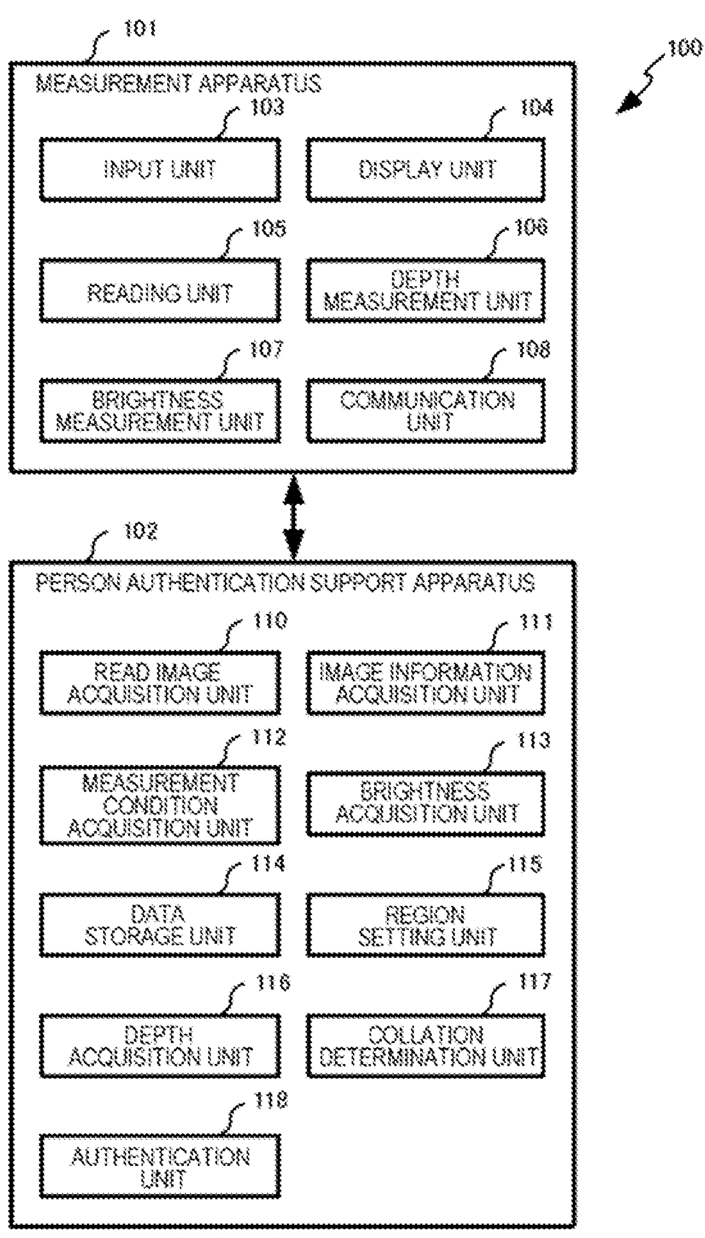
FIG. 1 is a diagram illustrating a configuration of a person authentication support system according to an example embodiment 1 of the present invention.

As illustrated in FIG. 1, the person authentication support system 100 includes a measurement apparatus 101 and a person authentication support apparatus 102. The measurement apparatus 101 and the person authentication support apparatus 102 are connected to be able to transmit and receive information mutually via a network constituted by wired connection, wireless connection, or combining these as necessary.

Hereinafter, the person authentication support apparatus 102 is also simply described as a "support apparatus 102".

<Functional Configuration of Measurement Apparatus 101>

The measurement apparatus 101 is an apparatus capable of generating information to be used in person authentication of a target person, and functionally includes an input unit 103, a display unit 104, a reading unit 105, a depth measurement unit 106, a brightness measurement unit 107, and a communication unit 108.

The input unit 103 accepts an instruction of a target person. The display unit 104 displays information to a target person.

The reading unit 105 is constituted of a camera 1070 (see FIG. 6), and the like, and generates image information indicating an image of a photographing region SA by photographing the photographing region SA including a face of a target person.

Further, the reading unit 105 reads information indicated by an identity verification document by photographing the identity verification document being associated with a face image of a target person, and generates read image information indicating the photographed read image M. The identity verification document is desirably a public document, and is a driver's license, a personal number card (so-called My number card) or the like.

Figure 2:
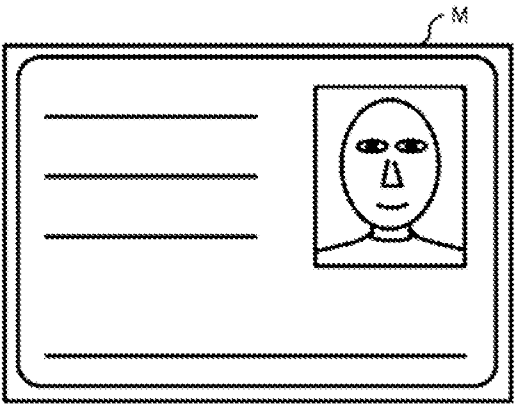
FIG. 2 is a diagram illustrating one example of a read image.

FIG. 2 illustrates one example of the read image M. Regarding the read image M illustrated in FIG. 2, a face image of a target person is associated with an identity verification document by including a face photo of the target person on one surface of the identity verification document.

FIG. 1 is referred to again.

The depth measurement unit 106 measures a depth of each of a plurality of predetermined measurement points MP in association with a photographing region SA to be photographed by the reading unit 105, and generates depth information indicating the measured depth. A depth of a plurality of measurement points MP is a distance from the reading unit 105 to a point in a real space associated with each of the plurality of measurement points MP.

For example, in a case where the reading unit 105 and the depth measurement unit 106 are respectively constituted of the camera 1070 and a depth sensor 1090 (see FIG. 6), the camera 1070 and the depth sensor 1090 may be provided at a position close to each other in the measurement apparatus 101. This enables to substantially measure a distance from the reading unit 105 to each of the measurement points MP.

The brightness measurement unit 107 is an illuminance sensor 1080 (see FIG. 6) for measuring brightness of a photographing environment at a time when an image is photographed by the reading unit 105, and generates brightness information indicating the measured brightness.

The communication unit 108 transmits and receives information to and from the support apparatus 102 via the above-described network. The communication unit 108 according to the present example embodiment transmits, to the support apparatus 102, image information, read image information, depth information, brightness information, and measurement condition information indicating a measurement condition of a depth in response to an instruction of a target person.

The measurement condition information is information indicating a measurement condition of a depth in the measurement apparatus 101, and in the present example embodiment, operating system (OS) information. The OS information is information for identifying an OS running on the measurement apparatus 101, and, for example, indicates a type, a version, or the like of an OS. The OS information is, for example, stored in advance in a storage unit (not illustrated) included in the measurement apparatus 101, and acquired by the communication unit 108.

<Functional Configuration of Person Authentication Support Apparatus 102>

The support apparatus 102 determines whether collation processing for person authentication of a target person is performed based on information generated by the measurement apparatus 101. Then, the support apparatus 102 performs collation processing or authentication processing for person authentication according to a determination result.

The support apparatus 102 functionally includes a read image acquisition unit 110, an image information acquisition unit 111, a measurement condition acquisition unit 112, a brightness acquisition unit 113, a data storage unit 114, a region setting unit 115, a depth reading unit 116, a collation determination unit 117, and an authentication unit 118.

The read image acquisition unit 110 acquires read image information from the measurement apparatus 101. The image information acquisition unit 111 acquires image information from the measurement apparatus 101. The measurement condition acquisition unit 112 acquires measurement condition information from the measurement apparatus 101. The brightness acquisition unit 113 acquires brightness information from the measurement apparatus 101.

The data storage unit 114 is a storage unit in which measurement condition versus accuracy data 114*a* are stored in advance. As illustrated in FIG. 3, the measurement condition versus accuracy data 114*a* are data in which measurement condition information and accuracy information are associated with each other. The accuracy information is information indicating measurement accuracy of a depth.

In the measurement condition versus accuracy data 114*a* illustrated in FIG. 3, measurement condition information indicates a type of an OS, and accuracy information indicates measurement accuracy of a depth. Specifically, in the measurement condition versus accuracy data 114*a* in FIG. 3, "150" is associated with an OS called "A", as measurement accuracy of a depth, and "80" is associated with an OS called "B", as measurement accuracy of a depth.

Note that, measurement condition information included in the measurement condition versus accuracy data 114*a* is not limited to two pieces of information, but may be modified as necessary.

The region setting unit 115 sets a processing region according to a measurement condition indicated by measurement condition information to be acquired by the measurement condition acquisition unit 112. The processing region is a region serving as a processing target of depth information in a photographing region SA of an image to be acquired by the image information acquisition unit 111.

Figure 4:
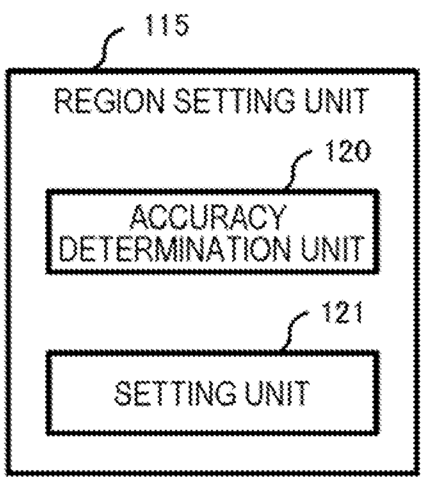
FIG. 4 is a diagram illustrating a configuration of a region setting unit according to the example embodiment 1.

More specifically, as illustrated in FIG. 4, the region setting unit 115 functionally includes an accuracy determination unit 120 and a setting unit 121.

The accuracy determination unit 120 determines whether measurement accuracy of a depth is high accuracy, based on measurement condition information to be acquired by the measurement condition acquisition unit 112.

The accuracy determination unit 120 according to the present example embodiment determines whether measurement accuracy of a depth is high accuracy according to whether measurement accuracy to be acquired based on measurement condition information, and the measurement condition versus accuracy data 114*a* satisfies a predetermined measurement criterion.

For example, the measurement criterion is a criterion in which, in a case where a value indicated by measurement accuracy information is equal to or more than a predetermined threshold value (e.g., "100"), measurement accuracy is high accuracy, and in a case where a value indicated by measurement accuracy information is less than the threshold value, measurement accuracy is low accuracy.

In a case where measurement accuracy determined by the accuracy determination unit 120 is high accuracy, the setting unit 121 sets a processing region narrower than that in a case where the determined measurement accuracy is not high accuracy (in other words, is low accuracy).

For example, a processing region in a case where measurement accuracy is low accuracy is the entirety of a photographing region SA. A processing region in a case where measurement accuracy is high accuracy is a face region FR. The face region FR is a region associated with a face of a target person, and since the face region FR is a part of the photographing region SA, the face region FR is narrower than the entirety of the photographing region SA.

FIG. 1 is referred to again.

The depth acquisition unit 116 acquires, from the measurement apparatus 101, depth information including a depth in a processing region set by the region setting unit 115. The depth information to be acquired by the depth acquisition unit 116 indicates a depth measured in a measurement condition indicated by measurement information to be acquired by the measurement condition acquisition unit 112.

The depth acquisition unit 116 according to the present example embodiment acquires depth information from the measurement apparatus 101, in a case where brightness to be measured by the brightness measurement unit 107 satisfies a predetermined illuminance criterion.

The illuminance criterion according to the present example embodiment is defined, for example, by a range including an upper limit and a lower limit of brightness. For example, in a case where an upper limit value is THU [candela], and a lower limit value is THL [candela], the illuminance criterion is that brightness to be measured by the brightness measurement unit 107 is equal to or more than THL [candela], and equal to or less than THU [candela].

Further, in the present example embodiment, the depth acquisition unit 116 acquires, from the measurement apparatus 101, depth information indicating a depth of the entirety of a photographing region SA.

The collation determination unit 117 determines whether image information of a target person is used in collation processing, based on depth information of a processing region set by the region setting unit 115.

The collation processing is, for example, processing of collating an image indicated by image information with a read image M, whereby it is confirmed that a person included in the image indicated by the image information, and a person included in the read image M are a same person (target person). More specifically, for example, in a case where a degree of similarity of a feature value of a face image of a person included in an image indicated by image information, and a read image M is equal to or more than a predetermined threshold value, it is presumed that a person included in the image indicated by the image information, and a person included in the read image M are a same person. Further, in a case where the degree of similarity is less than the threshold value, it is presumed that a person included in the image indicated by the image information, and a person included in the read image M are not a same person.

Herein, generally, there is a method, as a typical method of so-called impersonation in which person authentication is received by an identity verification document of another person, in which a third person other than an individual (person) to be identified by an identity verification document displays, on a screen of a display or a monitor, an image acquired by photographing the person in advance, and photographs the image displayed on the screen. According to this method, in collation processing based on a degree of similarity of a feature value of a face image of a target person included in image information and a read image M, there is a case that a person included in the image indicated by the image information, and a person included in the read image M are presumed to be a same person, despite that the third person tries to receive person authentication by using the identity verification document of the another person.

In view of the above, in order to prevent an impersonation method as described above, the collation determination unit 117 confirms authenticity of image information, based on depth information of a processing region set by the region setting unit 115. Authenticity of image information means that an image of a person included in image information is acquired by actually photographing the person (in other words, photographing the person being present at a photographing place at a photographing time when the image information has been generated).

In a case where an image displayed on a screen of a display or a monitor is photographed, while it is often a case that depth information indicates a substantially flat surface because the screen is flat, in a case where a person has been actually photographed, depth information indicates unevenness of a certain degree or more. Therefore, the collation determination unit 117 can presume authenticity of image information, based on depth information of a processing region.

Then, in a case where image information is presumed to be authenticate, the collation determination unit 117 determines that the image information of the target person is used in collation processing, and in a case where image information is presumed not to be authenticate, the collation determination unit 117 determines that the image information of the target person is not used in collation processing.

Figure 5:
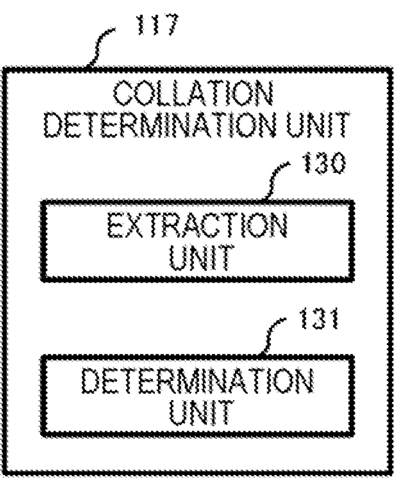
FIG. 5 is a diagram illustrating a configuration of a collation determination unit according to the example embodiment 1.

More specifically, as illustrated in FIG. 5, the collation determination unit 117 includes an extraction unit 130 and a determination unit 131.

The extraction unit 130 extracts depth information of a processing region set by the setting unit 121 from among depth information acquired by the depth acquisition unit 116.

The determination unit 131 determines whether image information of a target person is used in collation processing by using depth information extracted by the extraction unit 130.

More specifically, the determination unit 131 derives an unevenness level indicating a magnitude of unevenness in the processing region by using depth information extracted by the extraction unit 130. Then, the determination unit 131 determines whether image information of the target person is used in collation processing by comparing the derived unevenness level with a predetermined unevenness criterion.

The unevenness level is an index indicating a degree of unevenness in a processing region, and in the present example embodiment, is a standard deviation of unevenness in a processing region.

The unevenness criterion is set according to a general unevenness level in a case where a person has been actually photographed, and a different criterion is set according to measurement accuracy of a depth.

For example, when it is assumed that a processing region in a case where measurement accuracy is low accuracy is the entirety of a photographing region SA, a processing target includes a target person and a background thereof. Therefore, as an unevenness criterion for low accuracy, a value (e.g., a minimum value of a standard deviation of unevenness that occurs generally) according to a standard deviation of unevenness of a person and a background thereof in a case where the person has been actually photographed is set.

It is assumed that a processing region in a case where measurement accuracy is high accuracy is a partial region including a region associated with a face of a target person. As an unevenness criterion for high accuracy, a value (e.g., a minimum value of a standard deviation of unevenness in a face of a general person) according to a standard deviation of unevenness in a face of a general person is set.

FIG. 1 is referred to again.

The authentication unit 118 performs processing according to a determination result of the collation determination unit 117.

More specifically, in a case where it is determined by the collation determination unit 117 that image information of a target person is used in collation processing, the authentication unit 118 performs person authentication processing including collation processing of collating an image indicated by image information with a read image M. In the person authentication processing, for example, in a case where authenticity of an identity verification document is confirmed by authentication processing, it is further confirmed that information input by the target person coincides with a content of the identity verification document. Further, for example, in the person authentication processing, a date of expiry or the like of the identity verification document may be confirmed, and these pieces of information may be confirmed by an authenticator, and a result of the confirmation may be input to the support apparatus 102.

In a case where it is determined by the collation determination unit 117 that image information of a target person is not used in collation processing, the authentication unit 118 transmits a notification of the fact to the measurement apparatus 101. This allows the display unit 104 of the measurement apparatus 101 to display a fact that collation processing is not performed.

In the foregoing, a functional configuration of the person authentication support system 100 has been mainly described. Hereinafter, a physical configuration of the person authentication support system 100 is described with reference to the drawings.

<Physical Configuration of Measurement Apparatus 101>

The measurement apparatus 101 is physically, for example, a smartphone, a tablet terminal, or the like, and as illustrated in FIG. 6, includes a bus 1010, a processor 102, a memory 1030, a storage device 1040, a network interface 1050, a user interface 1060, the camera 1070, the illuminance sensor 1080, and the depth sensor 1090. Note that, the measurement apparatus 101 may be a personal computer or the like on which the camera 1070, the illuminance sensor 1080, and the depth sensor 1090 are mounted.

The bus 1010 is a data transmission path along which the processor 1020, the memory 1030, the storage device 1040, the network interface 1050, the camera 170, the illuminance sensor 1080, and the depth sensor 1090 mutually transmit and receive data. However, a method of mutually connecting the processor 1020 and the like is not limited to bus connection.

The processor 1020 is a processor to be achieved by a central processing unit (CPU), a graphics processing unit (GPU), or the like.

The memory 1030 is a main storage apparatus to be achieved by a random access memory (RAM) or the like.

The storage device 1040 is an auxiliary storage apparatus to be achieved by a hard disk drive (HDD), a solid state drive (SSD), a memory card, a read only memory (ROM), or the like. The storage device 1040 stores a program module for achieving each function of the measurement apparatus 101. The processor 1020 achieves each functional unit of the measurement apparatus 101 by reading each program module in the memory 1030 and executing each program module, and cooperating with the network interface 1050, the user interface 1060, the camera 1070, the illuminance sensor 1080, and the depth sensor 1090.

The network interface 1050 is an interface for communicating with the support apparatus 102 via a network, and constitutes the communication unit 108.

The user interface 1060 is a component for displaying information to a user, and allowing the user to input, and is constituted of, for example, a liquid crystal panel, a touch sensor provided on a screen of the liquid crystal panel, a keyboard, a mouse, and the like. The user interface 1060 constitutes the input unit 103 and the display unit 104.

The camera 1070 is an apparatus for photographing an image, and constitutes the reading unit 105. The illuminance sensor 1080 is a sensor for measuring an illuminance, and constitutes the brightness measurement unit 107. The depth sensor 1090 is a sensor for measuring a depth, and constitutes the depth measurement unit 106.

<Physical Configuration of Person Authentication Support Apparatus 102>

The person authentication support apparatus 102 is physically, for example, a personal computer, a host machine for a server apparatus, or the like, and, as illustrated in FIG. 7, includes a bus 2010, a processor 2020, a memory 2030, a storage device 2040, a network interface 2050, and a user interface 2060.

The bus 2010 is a data transmission path along which the processor 2020, the memory 2030, the storage device 2040, the network interface 2050, and the network interface 2060 mutually transmit and receive data. However, a method of mutually connecting the processor 2020 and the like is not limited to bus connection.

The processor 2020 is a processor to be achieved by a central processing unit (CPU), a graphics processing unit (GPU), or the like.

The memory 2030 is a main storage apparatus to be achieved by a random access memory (RAM) or the like.

The storage device 2040 is an auxiliary storage apparatus to be achieved by a hard disk drive (HDD), a solid state drive (SSD), a memory card, a read only memory (ROM), or the like. The storage device 2040 stores a program module for achieving each function of the measurement apparatus 101. The processor 2020 achieves each functional unit of the measurement apparatus 101 by reading each program module in the memory 2030 and executing each program module, and cooperating with the network interface 2050 and the user interface 2060 as necessary.

The network interface 2050 is an interface for communicating with the measurement apparatus 101 via a network.

The user interface 2060 is a component for displaying information to a user, and allowing the user to input, and is constituted of, for example, a liquid crystal panel, a touch sensor provided on a screen of the liquid crystal panel, a keyboard, a mouse, and the like.

In the foregoing, a configuration of the person authentication support system 100 has been described. Hereinafter, an operation of the person authentication support system 100 is described.

<Operation of Person Authentication Support System 100>

In the person authentication support system 100, measurement processing is performed by the measurement apparatus 101, and person authentication support processing is performed by the support apparatus 102. The measurement processing is processing for acquiring information (in the present example embodiment, image information, depth information, brightness information, and measurement condition information of a target person) to be utilized in person authentication support processing. The person authentication support processing is processing for supporting person authentication of a target person.

Hereinafter, these pieces of processing are described with reference to the drawings.

(Measurement Processing)

Figure 8:
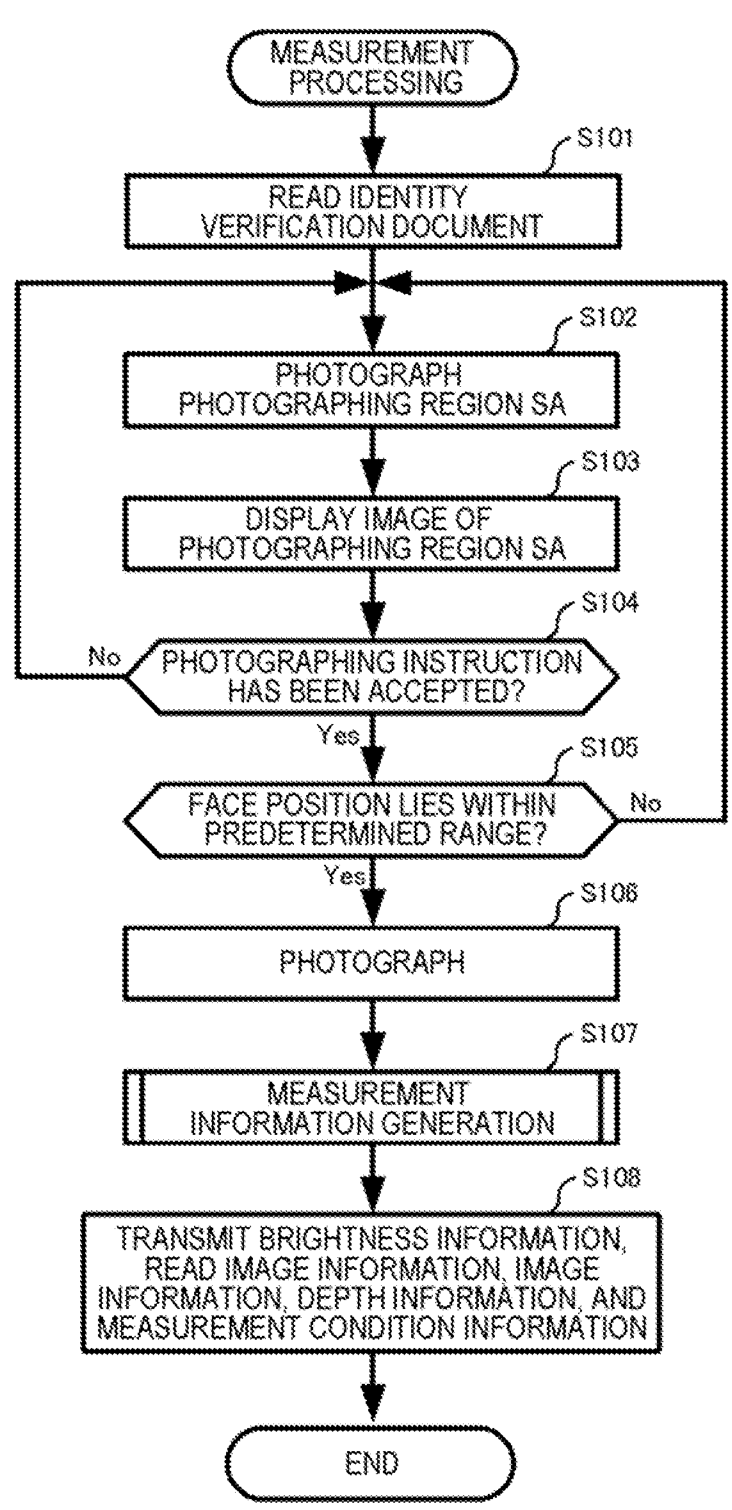
FIG. 8 is a flowchart illustrating one example of measurement processing according to the example embodiment 1 of the present invention.

FIG. 8 is one example of a flowchart of measurement processing according to the example embodiment 1 of the present invention. The measurement processing is, for example, started by causing the measurement apparatus 101 to execute an application, and accepting a predetermined instruction from a target person.

The reading unit 105 reads an identity verification document by photographing the identity verification document in response to an instruction of a target person (step S101). This allows the reading unit 105 to generate read image information indicating a read image M.

The reading unit 105 photographs a photographing region SA in response to an instruction of the target person (step S102), and the display unit 104 displays an image of the photographing region SA photographed by the reading unit 105 (step S103). This allows the display unit 104 to display the photographing region SA to be photographed by the reading unit 105 in real time.

Figure 9:
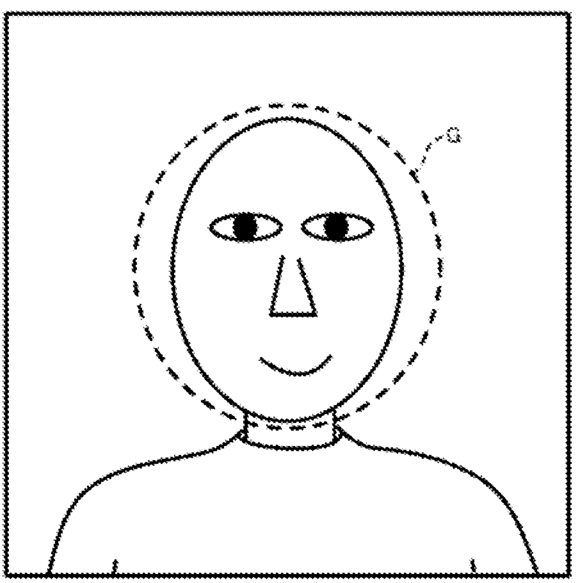
FIG. 9 is a diagram illustrating one example of an image of a photographing region SA to be displayed by a display unit.

FIG. 9 is a diagram illustrating one example of an image to be displayed in step S103, and the image indicates a photographing region SA photographed in step S102. As illustrated in FIG. 9, the image to be displayed in step S103 includes a guide G. The guide G indicates an appropriate range of a face of a target person in the image. A position of the measurement apparatus 101 may be adjusted in such a way that a contour of the face substantially coincides with the guide G.

The input unit 103 determines whether a predetermined photographing instruction has been accepted (step S104). The input unit 103 determines that a photographing instruction has not been accepted until the photographing instruction is input by the target person (step S104; No), and the reading unit 105 returns to the processing of step S102.

In a case where a photographing instruction is input by the target person, and it is determined that the photographing instruction has been accepted (step S104; Yes), the reading unit 105 determines whether a position of the face of the target person in the image of the photographing region SA lies within a predetermined range (step S105).

In a case where it is determined that the position of the face does not lie within the predetermined range (step S105; No), the reading unit 105 returns to the processing of step S102.

Figure 10:
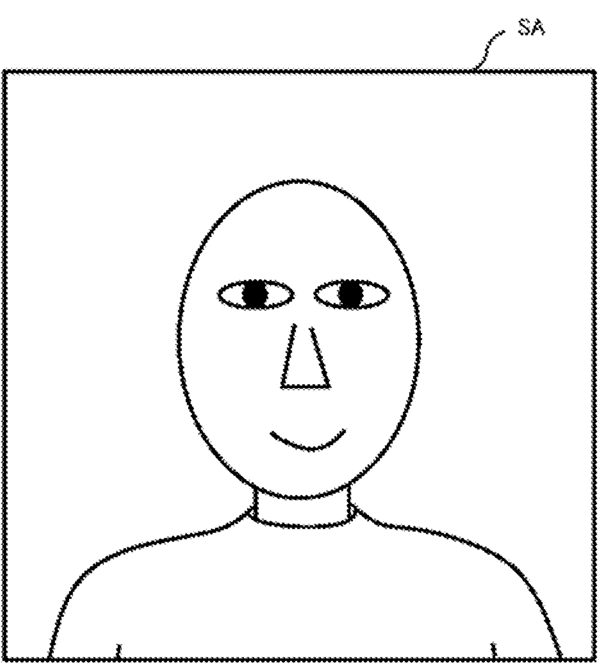
FIG. 10 is a diagram illustrating one example of an image of the photographing region SA including a face of a target person.

In a case where it is determined that the position of the face lies within the predetermined range (step S105; Yes), the reading unit 105 photographs the photographing region SA (step S106). This allows the reading unit 105 to generate image information indicating an image of the photographing region SA. FIG. 10 illustrates one example in which an image of the photographing region SA including a face of a photographer has been photographed in step S106.

Figure 11:
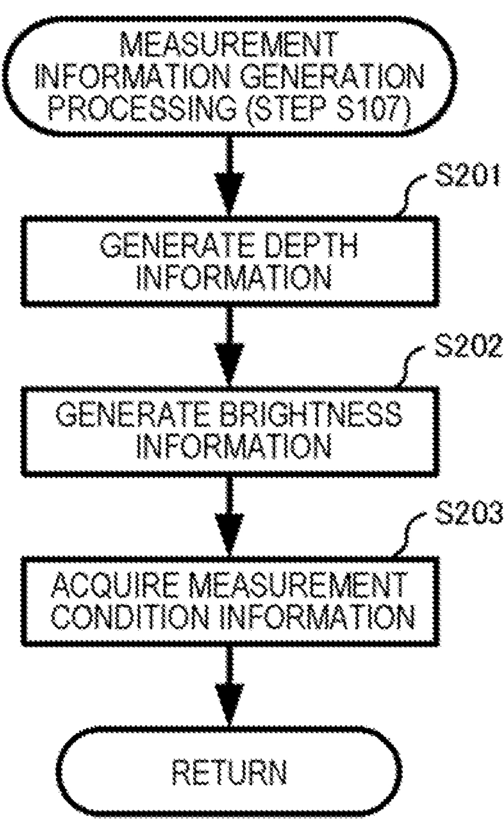
FIG. 11 is a flowchart illustrating one example of measurement information generation processing illustrated in FIG. 8.

Subsequently, as illustrated in FIG. 8, measurement information generation processing (step S107) is performed. FIG. 11 is a flowchart illustrating one example of measurement information generation processing (step S107).

The depth measurement unit 106 measures a depth of the photographing region SA photographed in step S106, and generates depth information indicating the measured depth (step S201).

Figure 12:
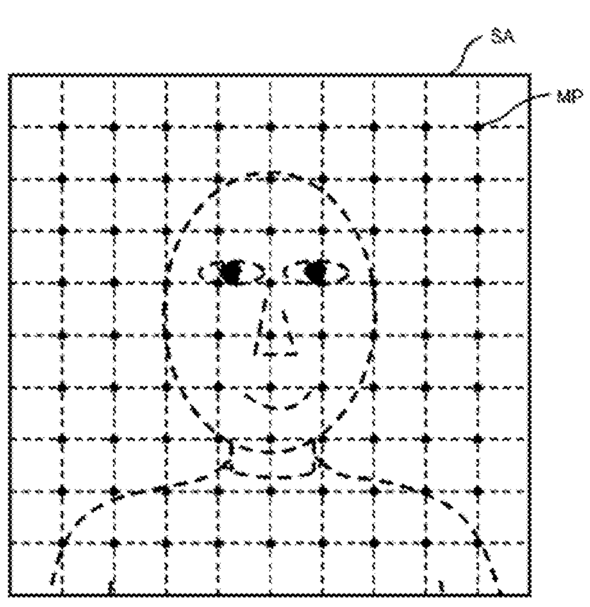
FIG. 12 is a diagram illustrating one example of a plurality of measurement points MP being determined in association with the photographing region SA.

FIG. 12 is a diagram illustrating one example of a plurality of measurement points MP being determined in association with a photographing region SA. In FIG. 12, the measurement points MP are indicated by black circles, and are arranged horizontally and vertically at an equidistance. In step S201, a distance between a point in a real space being associated with a measurement point MP, and the reading unit 105 is measured as a depth. In FIG. 12, an image of a target person is indicated by dotted lines in such a way that a positional relationship between the target person photographed in step S106, and the measurement points MP is made clear.

Note that, the present example embodiment is described by an example in which a plurality of measurement points MP are arranged horizontally and vertically at an equidistance. However, a layout of a plurality of measurement points MP is not limited thereto, and a plurality of measurement points MP may be arranged at any position.

FIG. 8 is referred to again.

The brightness measurement unit 107 measures brightness of a photographing environment at a time when a photographing region SA is photographed in step S106, and generates brightness information indicating the measured brightness (step S202).

The communication unit 108 acquires, from a storage unit (not illustrated), measurement condition information indicating a measurement condition of a depth measured in step S201 (step S203).

FIG. 8 is referred to again.

The communication unit 108 transmits brightness information, read image information, image information, depth information, and measurement condition information (step S108). In a case where the communication unit 108 transmits brightness information, and acquires a request, from the support apparatus 102, a request in response to this, the communication unit 108 transmits other pieces of the information (read image information, image information, measurement condition information, and depth information).

The read image information to be transmitted in step S108 is a piece of information generated by performing step S101. The image information to be transmitted in step S108 is a piece of information generated by performing step S106. The depth information and the brightness information to be transmitted in step S108 are pieces of information generated in steps S201 to S202. The measurement condition information to be transmitted in step S108 is a piece of information acquired in step S203.

This allows the communication unit 108 to finish the measurement processing.

(Person Authentication Support Processing)

Figure 13:
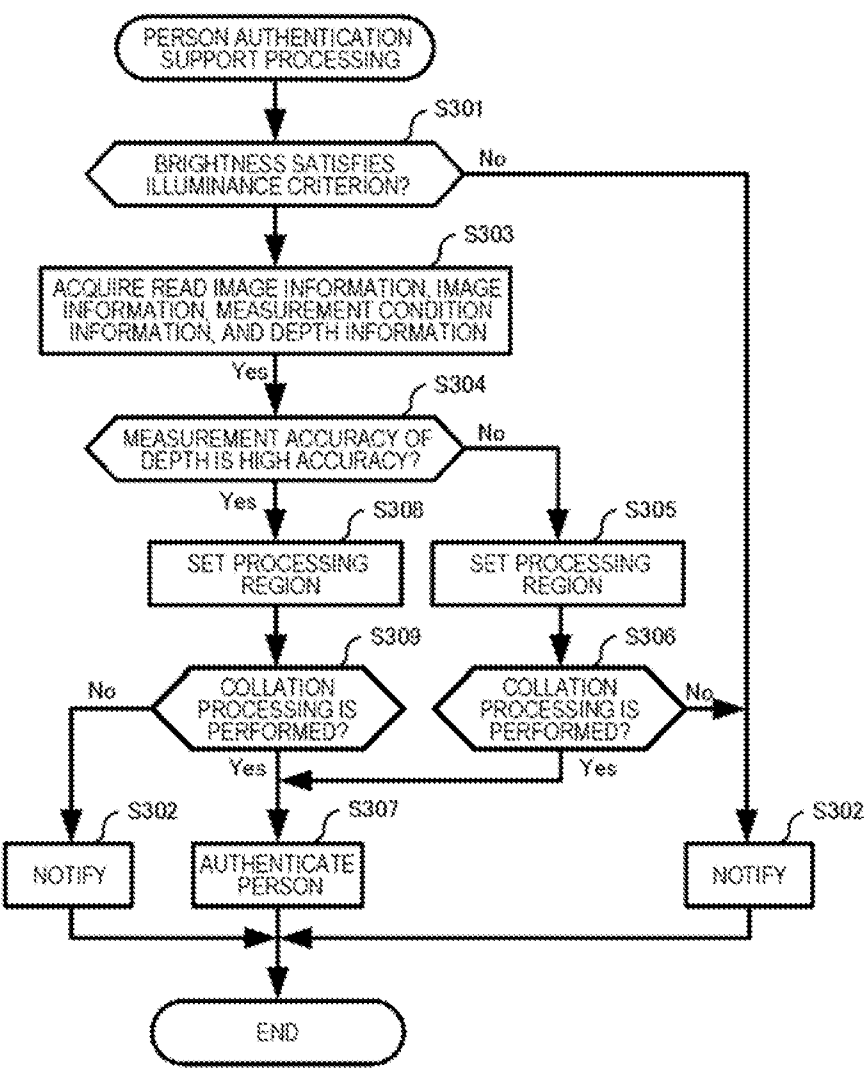
FIG. 13 is a flowchart illustrating one example of person authentication processing according to the example embodiment 1 of the present invention.

FIG. 13 is one example of a flowchart of person authentication support processing according to the example embodiment 1 of the present invention. The person authentication support processing is, for example, started by acquiring brightness information transmitted in step S108 by the brightness acquisition unit 113. Hereinafter, the person authentication support processing is also simply described as "support processing".

The collation determination unit 117 determines whether brightness indicated by brightness information acquired by the brightness acquisition unit 113 satisfies an illuminance criterion (step S301). In a case where it is determined that the illuminance criterion is not satisfied (step S301; No), the collation determination unit 117 performs notification processing (step S302) of transmitting, to the measurement apparatus 101, a notification that collation processing is not performed, and finishes the support processing.

As described above, the illuminance criterion is defined by a range including an upper limit and a lower limit, and the collation determination unit 117 determines that the illuminance criterion is not satisfied, in a case where brightness is out of the range defined by the illuminance criterion.

Generally, in a case where a photographing environment is dark, an image of image information becomes dark, and collation processing may not be performed accurately. Therefore, in a case where brightness is less than a lower limit value, the collation determination unit 117 determines that collation processing is not performed, and finishes the support processing by notifying the fact.

Further, in a case where a photographing environment is bright, there is a possibility that an image displayed on a screen of a display or a monitor has been photographed. Therefore, in a case where brightness exceeds an upper limit value, the collation determination unit 117 determines that collation processing is not performed, and finishes the support processing by notifying the fact.

In a case where it is determined that the illuminance criterion is satisfied (step S301; Yes), the collation determination unit 117 transmits a predetermined request to the measurement apparatus 101. In response to the request, the communication unit 108 transmits read image information, image information, measurement condition information, and depth information. The read image acquisition unit 110, the image information acquisition unit 111, the measurement condition acquisition unit 112, and the depth acquisition unit 116 respectively acquires read image information, image information, measurement condition information, and depth information (step S303).

The accuracy determination unit 120 determines whether measurement accuracy of a depth is high accuracy according to whether measurement accuracy to be acquired based on measurement condition information acquired in step S303, and the measurement condition versus accuracy data 114*a* satisfies a predetermined measurement criterion (step S304).

More specifically, the accuracy determination unit 120 acquires accuracy information being associated with measurement condition information acquired in step S302 in the measurement condition versus accuracy data 114*a*. The accuracy determination unit 120 determines whether measurement accuracy of a depth is high accuracy according to whether measurement accuracy indicated by the acquired accuracy information satisfies a measurement criterion.

For example, in a case where measurement condition information acquired in step S303 indicates "A", the accuracy determination unit 120 acquires accuracy information "150" being associated with the measurement condition information "A" in the measurement condition versus accuracy data 114*a* illustrated in FIG. 3. Then, the accuracy determination unit 120 compares "150" indicated by the acquired accuracy information with a measurement criterion. For example, in a case of a measurement criterion in which a case of being 100 or more indicates high accuracy, the accuracy determination unit 120 determines that measurement accuracy of a depth is high accuracy.

Further, for example, in a case where measurement condition information acquired in step S303 indicates "B", the accuracy determination unit 120 acquires accuracy information "80" being associated with the measurement condition information "B" in the measurement condition versus accuracy data 114*a* illustrated in FIG. 3. Then, in a case of being the above-described measurement criterion, the accuracy determination unit 120 determines that measurement accuracy of a depth is low accuracy by comparing "150" indicated by the acquired accuracy information with the measurement criterion.

FIG. 13 is referred to again.

In a case where it is determined that measurement accuracy is not high accuracy (in other words, is low accuracy) (step S303; No), the setting unit 121 sets, as a processing region, the entirety of the photographing region SA of image information acquired in step S303 (step S305).

The collation determination unit 117 determines whether image information of the target person is used in collation processing, in other words, collation processing using image information of the target person is performed, based on depth information of the entirety of the photographing region SA being a processing region set in step S305 (step S306).

More specifically, for example, the collation determination unit 117 determines, as a reference depth, a minimum depth among a plurality of measurement points MP included in depth information of the entirety of the photographing region SA. The collation determination unit 117 derives unevenness of each of measurement points MP included in the entirety of the photographing region SA by subtracting the reference depth from each depth included in depth information of the entirety of the photographing region SA. The collation determination unit 117 derives an unevenness level of the entirety of the photographing region SA by deriving a standard deviation of the derived unevenness.

The collation determination unit 117 compares the derived unevenness level with an unevenness criterion for low accuracy. For example, a minimum value of a general unevenness level in the entirety of the photographing region SA acquired by actually photographing a person is set as the unevenness criterion for low accuracy.

Since the entirety of the photographing region SA includes a target person, and a background thereof, while a certain degree of unevenness is present in the entirety of the actually photographed photographing region SA, a screen of a display or a monitor is substantially flat. Therefore, generally, a large variation occurs in unevenness in a case where the photographing region SA is actually photographed, as compared with unevenness in a case where a screen including a person displayed on a screen of a display or a monitor is photographed.

For a reason as described above, in a case where a derived unevenness level is larger than the unevenness criterion for low accuracy, it can be presumed that image information is authenticate (in other words, an image indicated by image information is an actually photographed image at a time when read image information is transmitted). Therefore, in a case where a derived unevenness level is larger than the unevenness criterion for low accuracy, the collation determination unit 117 determines that collation processing using image information of the target person is performed.

In contrast, in a case where a derived unevenness level is equal to or less than the unevenness criterion for low accuracy, since it is presumed that image information is not authenticate, the collation determination unit 117 determines that collation processing using image information of the target person is not performed.

In a case where it is determined that collation processing using image information of the target person is not performed (step S306; No), the collation determination unit 117 performs the above-described notification processing (step S302), and finishes the support processing.

In a case where it is determined that collation processing using image information of the target person is performed (step S306; Yes), the authentication unit 118 performs person authentication processing (step S307) including collation processing, and finishes the support processing.

In a case where it is determined that measurement accuracy is high accuracy (step S304; Yes), the setting unit 121 determines a face region FR from the photographing region SA of image information acquired in step S302, and sets the face region FR, as a processing region (step S308).

Figure 14:
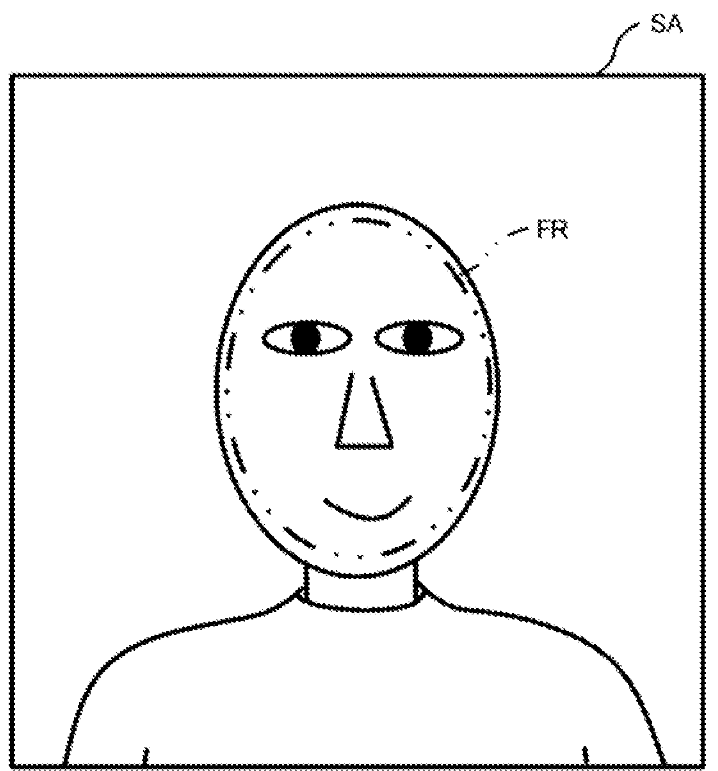
FIG. 14 is a diagram illustrating one example of a face region FR to be determined from the photographing region SA.

FIG. 14 illustrates one example of a face region FR to be determined from a photographing region SA. The face region FR may be determined by using a conventional image processing technique. For example, a conventional image processing technique may utilize a feature value or the like of an image included in image information. Further, for example, a conventional image processing technique may use a learned learning model for extracting a face region FR from an image including a face, and output the face region FR while using the image including the face, as an input.

Note that, FIG. 14 illustrates an example in which hair (head portion) is included, but clothes is not included by substantially including an outer edge along a contour of a face in the face region FR. However, the face region FR may include either or both of hair (head portion) and a neck, or may include the entirety or a part (e.g., a collar near a face) of clothes.

FIG. 13 is referred to again.

The collation determination unit 117 determines whether image information of a target person is used in collation processing, in other words, whether collation processing using image information of a target person is performed by using depth information of a face region FR being a processing region set in step S308 (step S309).

Figure 15:
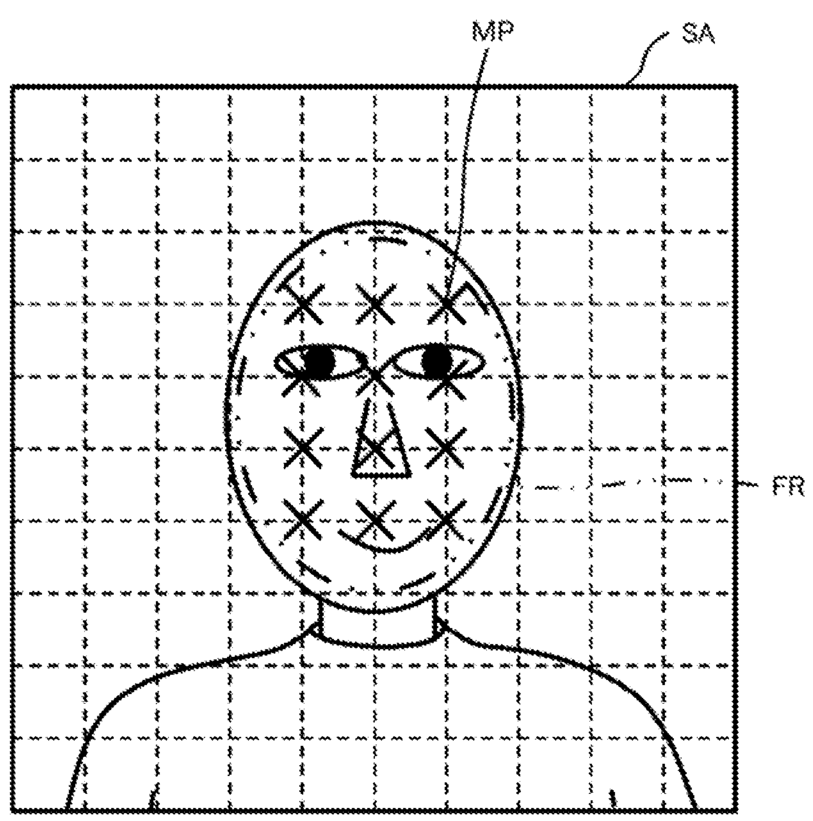
FIG. 15 is a diagram illustrating one example of a measurement point MP included in the face region FR.

FIG. 15 is a diagram illustrating one example of a measurement point MP included in a face region FR. In FIG. 15, the measurement point MP included in the face region FR is indicated by a x mark. Depth information of the face region FR is information indicating a depth at the measurement point MP included in the face region FR.

More specifically, for example, the collation determination unit 117 determines a minimum depth, as the reference depth, among depth information on measurement points MP included in a face region FR. The collation determination unit 117 derives unevenness of each of the measurement points MP included in the face region FR by subtracting the reference depth from each depth included in depth information of the face region FR. The collation determination unit 117 derives an unevenness level of the face region FR by deriving a standard deviation of the derived unevenness.

The collation determination unit 117 compares the derived unevenness level with an unevenness criterion for high accuracy. For example, a minimum value of an unevenness level in a face of a general person is set as the unevenness criterion for high accuracy.

While a face of a person includes unevenness in a nose and its surrounding, a screen of a display or a monitor is substantially flat. Therefore, generally, a large variation occurs in unevenness in a case where a face of a person has been actually photographed, as compared with unevenness in a case where a face of a person displayed on a screen of a display or a monitor has been photographed.

For a reason as described above, in a case where a derived unevenness level is larger than the unevenness criterion for high accuracy, it can be presumed that image information is authenticate. Therefore, in a case where a derived unevenness level is larger than the unevenness criterion for high accuracy, the collation determination unit 117 determines that image information of a target person is used in collation processing.

In contrast, in a case where a derived unevenness level is equal to or less than the unevenness criterion for high accuracy, since it is presumed that image information is not authenticate, the collation determination unit 117 determines that image information of the target person is not used in collation processing.

Herein, it is possible to presume authenticity of image information (whether an image indicated by image information is an actually photographed image) also by the entirety of a photographing region SA.

However, the entirety of the photographing region SA includes not only a face region FR of a target person, but also a region (region of hair and clothes) other than the face region FR of the target person, and a background region other than the target person. Since there are a variety of states of clothes and hair of a target person, and there are a variety of background states, the entirety of the photographing region SA includes relatively many uncertain elements that change by a photographing environment or a state at a photographing time. In a case where image information is authenticated by depth information of the entirety of the photographing region SA, authenticity of the image information may not be accurately determined due to an influence of an uncertain element.

In contrast, since the face region FR does not include a background or the like, uncertain elements are less as compared with the entirety of the photographing region SA. Therefore, by authenticating image information with use of depth information of the face region FR being a region narrower than the photographing region SA, a possibility that authenticity of image information can be accurately determined increases without substantially being affected by an uncertain element. However, generally, since the face region FR includes less unevenness as compared with the entirety of the photographing region SA, a depth measured in a measurement condition capable of measuring with high accuracy is necessary.

In view of the above, as described in the present example embodiment, in a case where it is determined that measurement accuracy of a depth is high accuracy, based on a measurement condition, it is possible to accurately presume authenticity of image information by using a depth of a face region FR. On the other hand, in a case where it is determined that a depth is measured with low accuracy, based on a measurement condition, it is possible to accurately presume authenticity of image information by using a depth of the entirety of a photographing region SA.

Herein, it may be understood from the above-described principle for presuming authenticity of image information that a processing region is desirably a region associated with a portion where unevenness is large. Therefore, in a case where measurement accuracy is high accuracy, it is desirable to set a processing region including a region associated with a nose, and the above-described face region FR is one example of a setting region including a region associated with a nose. Note that, it is more desirable that a processing region is a region of a nose and its surrounding.

FIG. 13 is referred to again.

In a case where it is determined that collation processing using image information of the target person is not performed (step S309; No), the collation processing 117 performs the above-described notification processing (step S302), and finishes the support processing.

In a case where it is determined that collation processing using image information of the target person is performed (step S309; Yes), the authentication unit 118 performs person authentication processing including the collation processing (step S307), and finishes the support processing.

In the foregoing, the example embodiment 1 according to the present invention has been described.

According to the present example embodiment, a measurement condition of a depth in the measurement apparatus 101 capable of generating image information indicating an image of a photographing region SA including a face of a target person, and depth information indicating a depth is acquired. Then, a processing region being a region serving as a processing target of the depth information in the photographing region SA is set according to the measurement condition. When the depth information including the depth in the processing region being measured under the above-described measurement condition is acquired, it is determined whether the image information of the target person is used in collation processing by using the depth information of the processing region.

As described in the present example embodiment, it is possible to accurately presume authenticity of image information by using depth information of a different processing region according to a measurement condition. Then, by determining whether the image information of the target person is used in collation processing according to a presumption result of authenticity of the image information, it is possible to accurately perform collation processing, and consequently, improve accuracy of person authentication. Therefore, it becomes possible to support accuracy improvement of person authentication.

According to the present example embodiment, in a case where brightness to be measured by the brightness measurement unit 107 satisfies a predetermined illuminance criterion, depth information of an photographing region SA is acquired.

It is possible to presume whether an image included in image information is appropriate for collation processing, or presume authenticity of image information by brightness of the image indicated by the image information or a photographing environment. Therefore, it becomes possible to support accuracy improvement of person authentication.

According to the present example embodiment, the illuminance criterion includes an upper limit and a lower limit of brightness.

In a dark photographing environment, it is often a case that an image of image information becomes unclear. Therefore, it is possible to presume whether an image included in image information is appropriate for collation processing by including the lower limit in the illuminance criterion.

Further, in a case of a bright photographing environment, an image displayed on a display or a monitor may be photographed. Therefore, it is possible to presume authenticity of image information by including the upper limit in the illuminance criterion.

Therefore, it becomes possible to support accuracy improvement of person authentication.

According to the present example embodiment, the measurement condition is at least one of information for identifying a depth sensor for measuring depth information, information for identifying an OS running on the measurement apparatus 101, information for identifying an equipment loaded with the depth sensor, information for identifying an available API, and information for identifying an equipment to be adopted as the measurement apparatus 101.

A measurement condition as described above can be associated with measurement accuracy of a depth indicated by depth information. By using depth information of a different processing region according to a measurement condition as described above, it is possible to accurately presume authenticity of image information. Therefore, it becomes possible to support accuracy improvement of person authentication.

According to the present example embodiment, it is determined whether measurement accuracy of a depth is high accuracy, based on a measurement condition, and in a case where measurement accuracy is high accuracy, a processing region narrower than that in a case where measurement accuracy is not high accuracy is set.

In a case where measurement accuracy is high accuracy, by setting, as a processing region, a region in which uncertain elements are relatively less, like a face region FR exemplified in the present example embodiment, it is possible to accurately presume authenticity of image information. Therefore, it becomes possible to support accuracy improvement of person authentication.

According to the present example embodiment, a processing region in a case where measurement accuracy is high accuracy includes a region associated with a nose of a target person.

The region associated with a nose is a region where uncertain elements are relatively less, and an amount of unevenness is relatively large. By setting a region as described above, as a processing region in a case where measurement accuracy is high accuracy, it is possible to accurately presume authenticity of image information. Therefore, it becomes possible to support accuracy improvement of person authentication.

According to the present example embodiment, depth information of a photographing region SA is acquired by the depth acquisition unit 116, and depth information of a processing region is extracted from the acquired depth information. Then, it is determined whether image information of a target person is used in collation processing, based on the extracted depth information.

This enables to accurately presume authenticity of image information by using depth information of a different processing region according to a measurement condition. Therefore, it becomes possible to support accuracy improvement of person authentication.

According to the present example embodiment, by comparing an unevenness level indicating a magnitude of unevenness in a processing region with a predetermined unevenness criterion with use of depth information of the processing region, it is determined whether image information of a target person is used in collation processing.

By comparing an unevenness level with an unevenness criterion with use of depth information of a different processing region according to a measurement condition, it is possible to accurately presume authenticity of image information. Therefore, it becomes possible to support accuracy improvement of person authentication.

Example Embodiment 2

In the example embodiment 1, an example in which, in a case where brightness information is generated by the brightness measurement unit 107, and brightness indicated by the brightness information satisfies an illuminance criterion, the depth acquisition unit 116 acquires depth information from the measurement apparatus 101 has been described. However, the brightness measurement unit 107 may not be included in a person authentication support system.

In this case, the depth acquisition unit 116 may acquire depth information from the measurement apparatus 101, regardless of brightness or the like of a photographing environment.

<Configuration of Person Authentication Support System 200>

Figure 16:
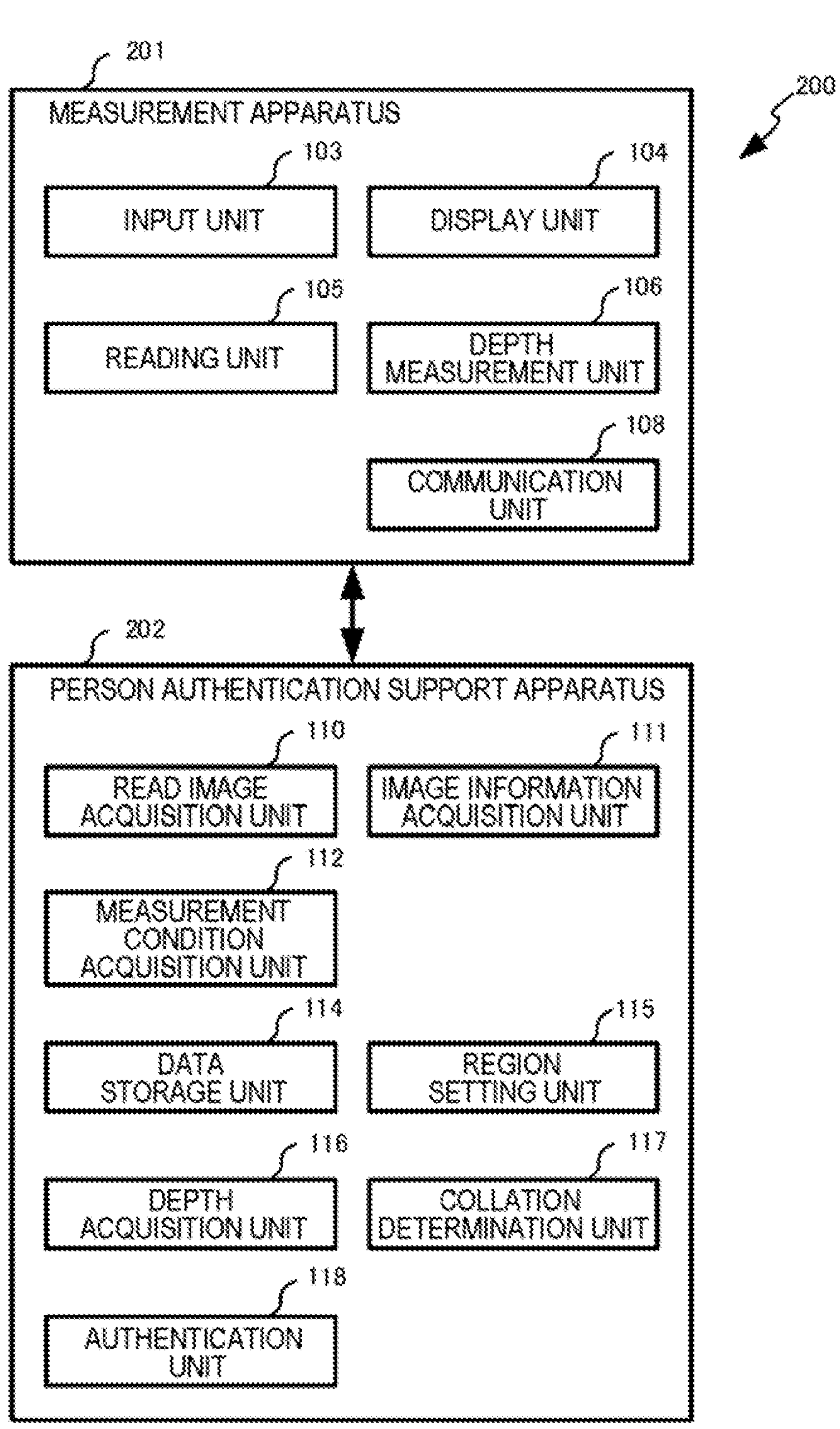
FIG. 16 is a diagram illustrating a configuration of a person authentication support system according to an example embodiment 2 of the present invention.

Similarly to the example embodiment 1, a person authentication support system 200 according to an example embodiment 2 of the present invention is a system for supporting person authentication of a target person. As illustrated in FIG. 16, the person authentication support system 200 includes a measurement apparatus 201 and a person authentication support apparatus 202.

The measurement apparatus 201 does not include a brightness measurement unit 107, and the person authentication support apparatus 202 does not include a brightness acquisition unit 113. Except for these points, the measurement apparatus 201 and the person authentication support apparatus 202 according to the present example embodiment may be functionally configured to be similar to each of the measurement apparatus 101 and the person authentication support apparatus 102 according to the example embodiment 1.

Physically, the measurement apparatus 201 according to the present example embodiment may not physically include an illuminance sensor 1080 (not illustrated). Except for this point, the measurement apparatus 201 and the person authentication support apparatus 202 may be configured to be similar to each of the measurement apparatus 101 and the person authentication support apparatus 102 according to the example embodiment 1.

<Operation of Person Authentication Support System 200>

(Measurement Processing)

In the person authentication support system 200, measurement processing is performed by the measurement apparatus 201, and person authentication support processing is performed by the support apparatus 202.

Figure 17:
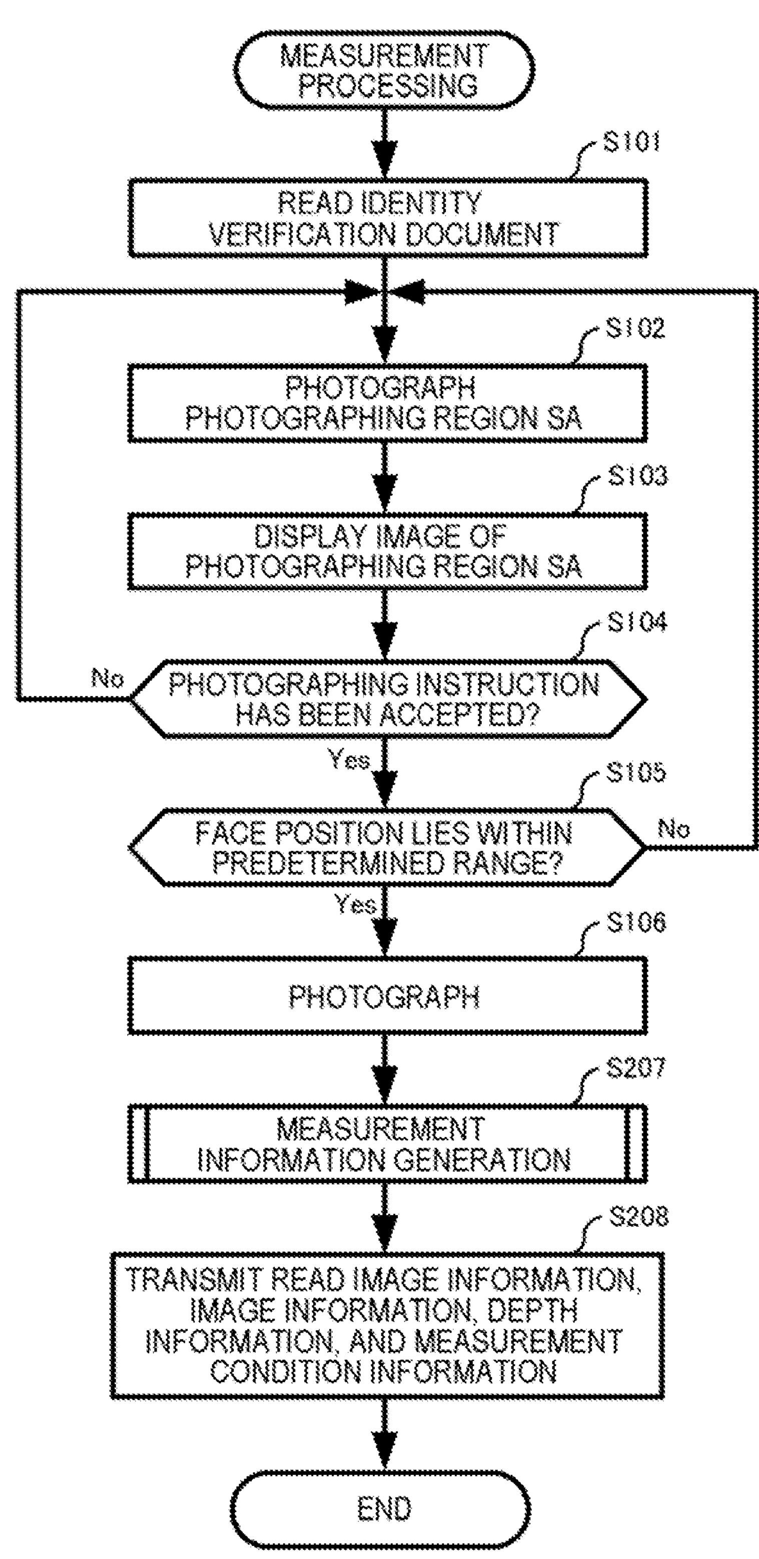
FIG. 17 is a flowchart illustrating one example of measurement processing according to the example embodiment 2 of the present invention.

FIG. 17 is one example of a flowchart of measurement processing according to the example embodiment 2 of the present invention. As illustrated in FIG. 17, in measurement processing according to the present example embodiment, pieces of processing of steps S101 to S106 similar to those of the example embodiment 1 are performed. Then, measurement information generation processing (step S207) is performed, in place of measurement information generation processing (step S107) according to the example embodiment 1.

Figure 18:
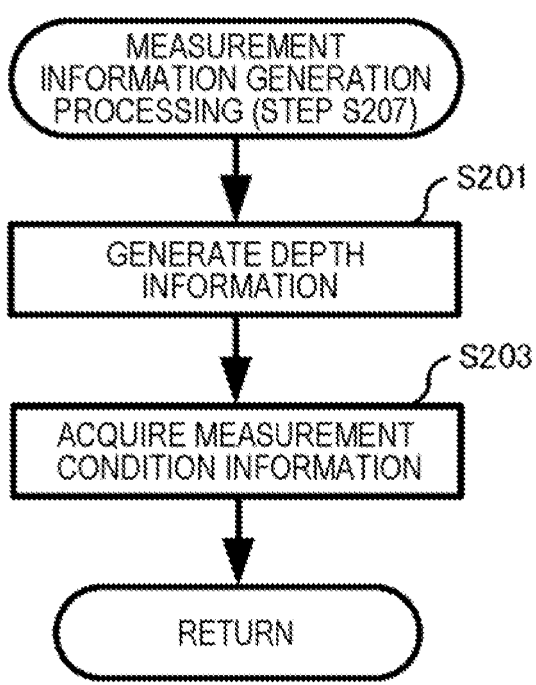
FIG. 18 is a flowchart illustrating one example of measurement information generation processing illustrated in FIG. 17.

FIG. 18 is a flowchart illustrating one example of measurement information generation processing (step S207). As illustrated in FIG. 18, measurement information generation processing (step S207) according to the present example embodiment does not include processing of step S202 in measurement information generation processing (step S107) according to the example embodiment 1. Specifically, when pieces of processing similar to steps S201 and S203 according to the example embodiment 1 are performed, a communication unit 108 returns to measurement processing.

As illustrated in FIG. 17, the communication unit 108 transmits read image information, image information, depth information, and measurement condition information (step S208), and finishes the measurement processing.

(Person Authentication Support Processing)

Figure 19:
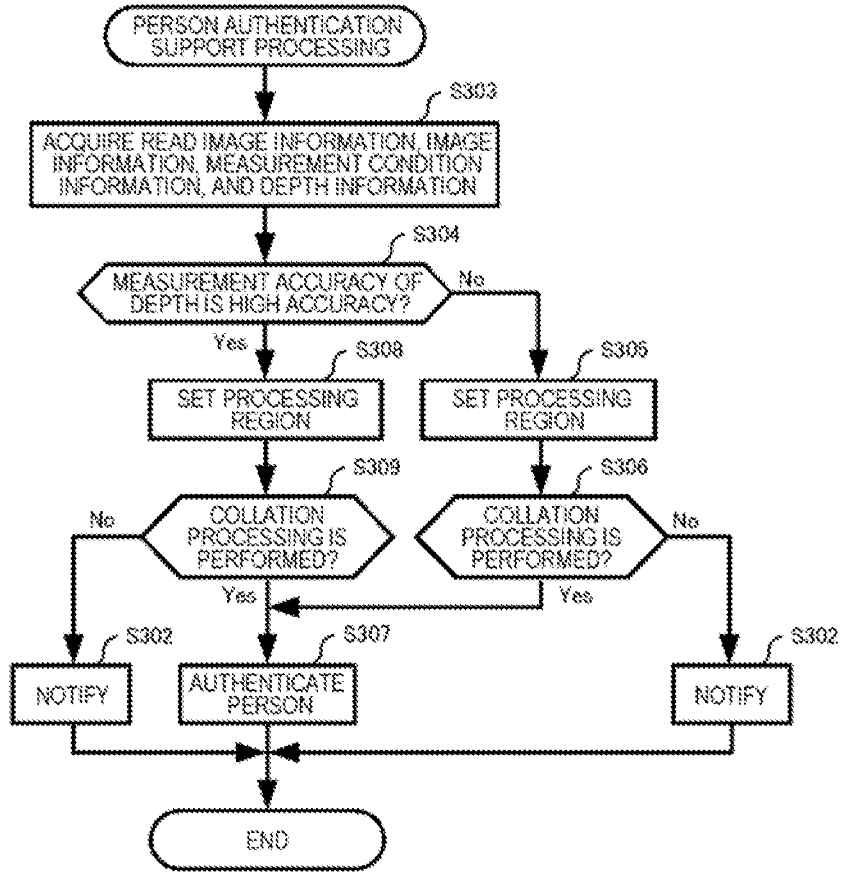
FIG. 19 is a flowchart illustrating one example of person authentication processing according to the example embodiment 2 of the present invention.

FIG. 19 is one example of a flowchart of person authentication support processing according to the example embodiment 2 of the present invention. As illustrated in FIG. 19, in person authentication support processing according to the present example embodiment, processing of step S301 according to the example embodiment 1 is not performed. Except for this point, person authentication support processing according to the present example embodiment is substantially similar to person authentication support processing according to the example embodiment 1.

Also according to the present example embodiment, a measurement condition of a depth in a measurement apparatus 101 capable of generating image information indicating an image of a photographing region SA including a face of a target person, and depth information indicating a depth is acquired. Then, a processing region being a region serving as a processing target of the depth information in the photographing region SA is set according to the measurement condition. When the depth information including the depth in the processing region being measured under the above-described measurement condition is acquired, it is determined whether the image information of the target person is used in collation processing, based on the depth information of the processing region.

Therefore, similarly to the example embodiment 1, it becomes possible to support accuracy improvement of person authentication.

Further, according to the present example embodiment, except for an advantageous effect related to brightness to be measured by the brightness measurement unit 107, and an illuminance criterion, an advantageous effect similar to another advantageous effect according to the example embodiment 1 is provided.

In the foregoing, one example embodiment and modification examples according to the present invention have been described with reference to the drawings, but these are an example of the present invention, and these may be modified as necessary.

Modification Example 1: Modification Example of Measurement Condition Information The example embodiments have been described by an example in which measurement condition information is OS information. However, measurement condition information is not limited to OS information, and, for example, may be depth sensor information, API information, equipment information, image information, environment information, or depth information. Further, the measurement condition information may be one of these exemplified pieces of information, or combination of a plurality thereof.

The depth sensor information is information for identifying a depth sensor constituting a depth measurement unit 106, and, for example, indicates a type (such as a manufacturer, a model number, or a part number) of a depth sensor, a measurement method of a depth sensor, and the like.

The API information is information for identifying an available application programming interface (API). The API is a function for utilizing a function of an OS.

The equipment information is information for identifying an equipment to be adopted as a measurement apparatus 101, and, for example, indicates a type (such as a manufacturer, a model number, or a part number) of the equipment, a production time of the equipment, and the like.

The depth sensor information, the API information, and the equipment information may be stored in advance in a storage unit (not illustrated) included in the measurement apparatus 101.

The environment information is information indicating a photographing environment of an image, and, for example, is brightness information.

Also by the present modification example, an advantageous effect similar to that of the example embodiments is provided.

Modification Example 2: Modification Example of Brightness Information

In the example embodiments, an example in which brightness information is generated by the brightness measurement unit 107 has been described. However, brightness information may be information indicating brightness of an image indicated by image information, and brightness information in this case may be derived, for example, based on image information by a collation determination unit 117, a depth acquisition unit 116, or the like. In this case, brightness information may be acquired, for example, by deriving an average value of a luminance of each pixel included in image information.

Also by the present modification example, an advantageous effect similar to that of the example embodiments is provided.

Modification Example 3: Modification Example of Measurement Condition Versus Accuracy Data, and Region Setting Unit In the example embodiments, an example in which accuracy information of the measurement condition versus accuracy data 114*a* indicates a value according to measurement accuracy of a depth has been described. However, as described above, accuracy information may be information indicating measurement accuracy of a depth.

For example, as illustrated by measurement condition versus accuracy data 114*b* in FIG. 20, information indicating whether measurement accuracy is high or low may be set as accuracy information, in place of the measurement accuracy of a depth. In this case, a region setting unit 115 may not include an accuracy determination unit 120, and a processing region may be set according to accuracy information associated with measurement condition information in the measurement condition versus accuracy data 114*a*.

Also by the present modification example, an advantageous effect similar to that of the example embodiments is provided.

Modification Example 4: First Modification Example of Depth Acquisition Unit

In the example embodiment 1, an example in which, in a case where brightness to be measured by an illuminance sensor satisfies an illuminance criterion, the depth acquisition unit 116 acquires depth information of an photographing region SA has been described. However, a case where a depth acquisition unit acquires depth information of the photographing region SA is not limited thereto.

For example, a depth acquisition unit may acquire depth information of an a photographing region SA, in a case where brightness of an image indicated by image information satisfies a predetermined illuminance criterion. In this case, since brightness information is not necessary, for example, a measurement apparatus 101 may not include a brightness measurement unit 107.

Also by the present modification example, an advantageous effect similar to that of the example embodiments is provided.

Modification Example 5: Second Modification Example of Depth Acquisition Unit

In the example embodiments, an example in which the depth acquisition unit 116 acquires, from the measurement apparatus 101, depth information indicating a depth of the entirety of the photographing region SA has been described. However, a depth acquisition unit may acquire, from a measurement apparatus 101, depth information indicating a depth of only a processing region set by a region setting unit 115. In this case, a collation determination unit may determine whether image information of a target person is used in collation processing, based on depth information acquired by the depth acquisition unit.

Also by the present modification example, an advantageous effect similar to that of the example embodiments is provided.

Modification Example 6: First Modification Example of Unevenness Level

The example embodiments have been described by an example in which an unevenness level is a standard deviation of unevenness in a processing region. However, the unevenness level may be an index indicating a degree of unevenness in a processing region. For example, the unevenness level may be an average value of unevenness, a maximum value of a difference in unevenness, or the like in a processing region. In this case, a value associated with an unevenness level may be set, as an unevenness criterion.

Further, the index to be adopted as the unevenness level is not limited to a continuous value, but may be a value, a symbol, an alphabet, or the like by which a degree of unevenness is indicated stepwise. As the unevenness criterion, a value, a symbol, an alphabet, or the like associated with the unevenness level may be adopted in such a way as to be able to compare with the unevenness level.

Also by the present modification example, an advantageous effect similar to that of the example embodiments is provided.

Modification Example 7: Second Modification Example of Unevenness Level

The example embodiments have been describe by an example in which an unevenness level is a standard deviation of unevenness in a processing region. However, as described above, the unevenness level may be an index indicating a degree of unevenness in a processing region. The unevenness level is, for example, a maximum value of unevenness in a specific region in a processing region.

The specific region in this case is a region in which unevenness is larger than that of another region in a processing region. For example, in a case where a processing region in a case where measurement accuracy of a depth is high accuracy is a face region FR, a nose region being a region in which unevenness in the face region FR is generally larger than that in another region may be adopted as the specific region. The nose region is a region of a nose and its surrounding.

The nose region may be determined by using a conventional image processing technique. For example, the conventional image processing technique may utilize a feature value or the like of an image included in image information. Further, for example, the conventional image processing technique may be a technique in which a learned learning model for extracting a nose region from an image including a face is used, and a nose region is output by using the image including the face, as an input. Furthermore, for example, the nose region may be determined based on a size of a face region FR to be determined by the conventional image processing technique, and a position of an eye.

Note that, as the unevenness level, for example, a value, a symbol, an alphabet or the like according to a maximum value of unevenness in a specific region in a processing region may be adopted as an index. Further, as the unevenness level, a depth itself, or an index based on a depth itself may be used, in place of an index based on unevenness.

Also by the present modification example, an advantageous effect similar to that of the example embodiments is provided.

Modification Example 8: Modification Example 1 of Configuration of Person Authentication Support System An example in which the person authentication support system 100 according to the example embodiment includes the measurement apparatus 101 and the person authentication support apparatus 102, the measurement apparatus 101 includes the functional units 103 to 107, and the person authentication support apparatus 102 includes the functional units 110 to 118 has been described (see FIG. 1).

However, functional units 103 to 107 and 110 to 118 may be included as the entirety of a person authentication support system, and, for example, a measurement apparatus may include some or all of the functional units 110 to 118.

Figure 21:
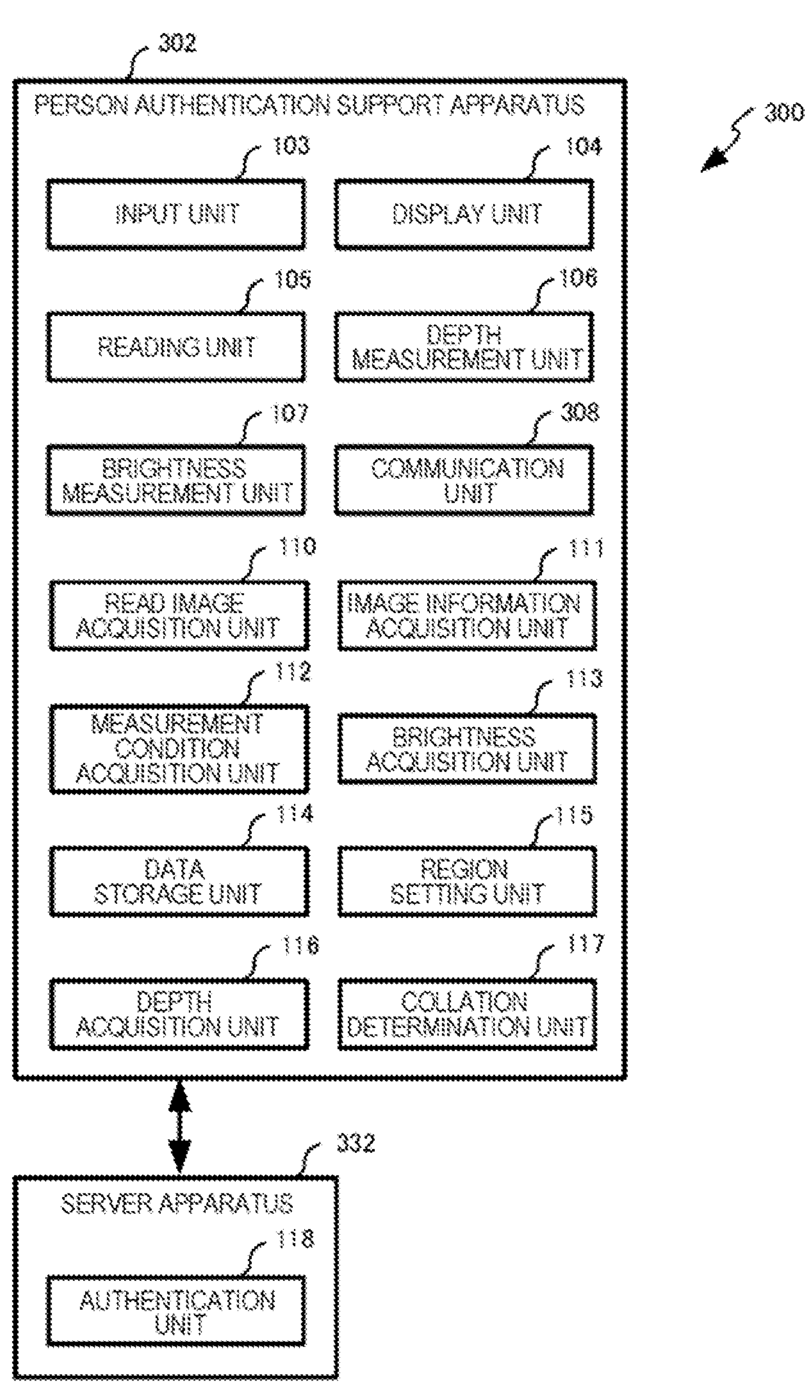
FIG. 21 is a diagram illustrating a functional configuration of a person authentication support system according to a modification example 8.

Further, a person authentication support apparatus 302 may include the functional units 103 to 107 included in the measurement apparatus 101 according to the example embodiment 1. FIG. 21 illustrates a configuration of a person authentication support system 300 according to a modification example 8 being one of modification examples as described above.

The person authentication support system 300 includes the person authentication support system 302, and a server apparatus 332. The person authentication support apparatus 302 and the server apparatus 332 are connected in such a way that information can be transmitted and received mutually via a network constituted by wired connection, wireless connection, or combining these as necessary.

The person authentication support apparatus 302 functionally includes an input unit 103, a display unit 104, a reading unit 105, a depth measurement unit 106, and a brightness measurement unit 107 similarly to the example embodiment 1. Further, the person authentication support apparatus 302 functionally includes a read image acquisition unit 110, an image information acquisition unit 111, a measurement condition acquisition unit 112, a brightness acquisition unit 113, a data storage unit 114, a region setting unit 115, a depth acquisition unit 116, and an illuminance determination unit 117.

However, the functional units 103 to 107 and 110 to 117 included in the person authentication support apparatus 302 may output and acquire information mutually via an internal bus, in place of transmitting and receiving information via a network in the example embodiments.

The person authentication support apparatus 302 further includes a communication unit 308, in place of the communication unit 108 according to the example embodiments. The communication unit 308 transmits and receives information to and from the server apparatus 332. The communication unit 308 according to the present modification example, for example, transmits, to the server apparatus 332, image information and read image information in response to an instruction of a target person, or when processing in the person authentication support apparatus 302 is finished.

The server apparatus 332 includes an authentication unit 118 similarly to the example embodiments.

The person authentication support apparatus 302 may physically include a configuration described with reference to FIG. 6. A server apparatus 332 may physically include a configuration described with reference to FIG. 7.

Function units of the person authentication support apparatus 302 and the server apparatus 303 may perform processing similar to processing (in other words, pieces of processing described with reference to FIGS. 8, 13, and the like) to be performed by an associated functional unit in the example embodiment 1. Note that, also in the present modification example, similarly to the example embodiment 2, a brightness measurement unit 107 and a brightness acquisition unit 113 may not be included in the person authentication support apparatus 302.

Also by the present modification example, an advantageous effect similar to that of the example embodiments is provided.

Modification Example 9: Modification Example 2 of Configuration of Person Authentication Support System A person authentication support system may not include a measurement apparatus 101, 201, and a server apparatus 303, and may be constituted of a person authentication support apparatus.

Figure 22:
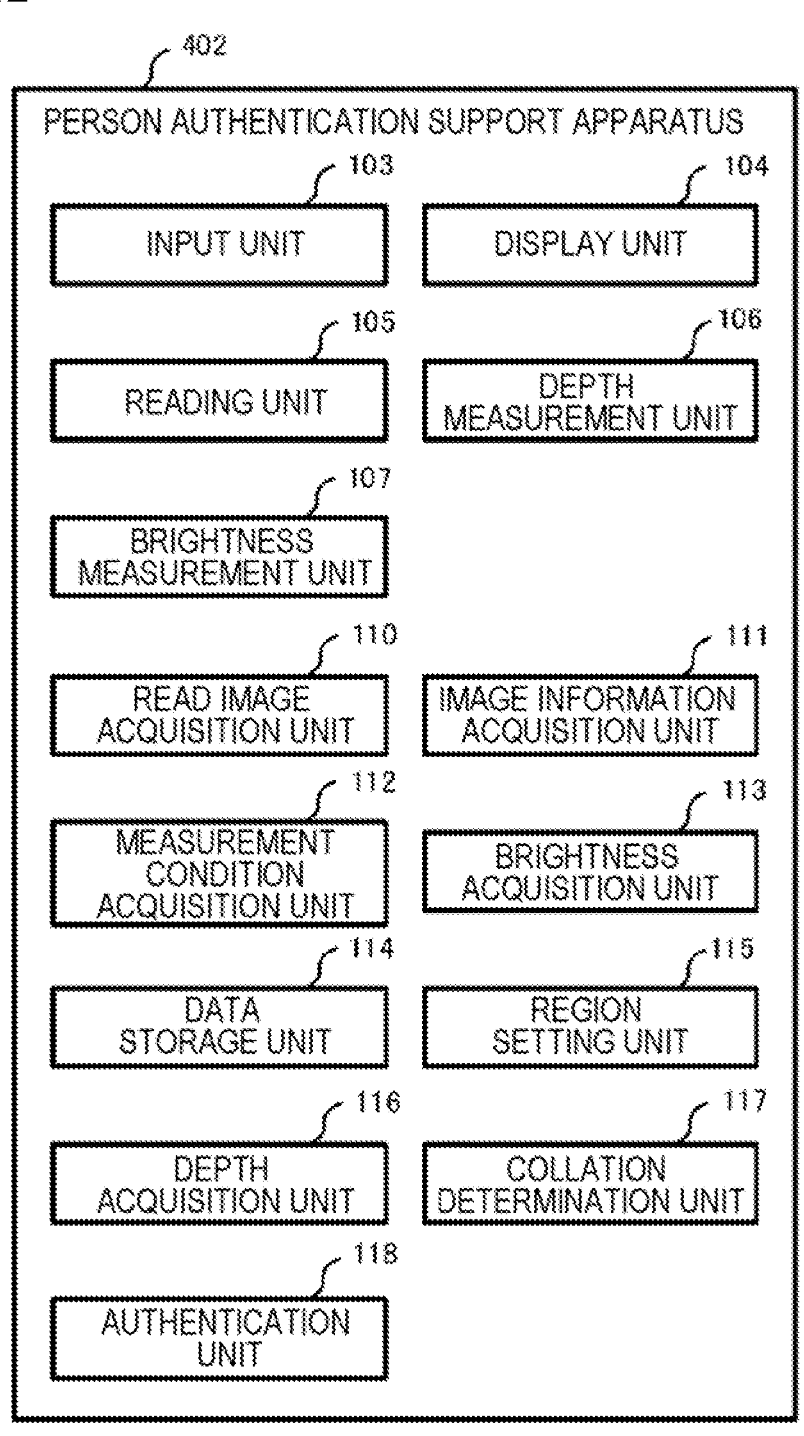
FIG. 22 is a diagram illustrating a functional configuration of a person authentication support apparatus according to a modification example 9.

FIG. 22 is a diagram illustrating a functional configuration of a person authentication support apparatus 402 according to a modification example 9.

As illustrated in FIG. 22, the person authentication support apparatus 402 according to the present modification example functionally includes an input unit 103, a display unit 104, a reading unit 105, a depth measurement unit 106, and a brightness measurement unit 107 similarly to the example embodiment 1. Further, the person authentication support apparatus 402 functionally includes a read image acquisition unit 110, an image information acquisition unit 111, a measurement condition acquisition unit 112, a brightness acquisition unit 113, a data storage unit 114, a region setting unit 115, a depth acquisition unit 116, a collation determination unit 117, and an authentication unit 118.

Functional units 103 to 107, and 110 to 118 included in the person authentication support apparatus 402 may output and acquire information mutually via an internal bus, in place of transmitting and receiving information via a network in the example embodiments. Therefore, the person authentication support apparatus 402 may not include a communication unit 108, as illustrated in FIG. 22.

The person authentication support apparatus 402 may physically include a configuration described with reference to FIG. 6.

Each functional unit of the person authentication support apparatus 402 may perform processing similar to processing (in other words, pieces of processing described with reference to FIGS. 8, 13, and the like) to be performed by an associated functional unit in the example embodiment 1. Note that, also in the present modification example, similarly to the example embodiment 2, a brightness measurement unit 107 and a brightness acquisition unit 113 may not be included in the person authentication support apparatus 402.

Also by the present modification example, an advantageous effect similar to that of the example embodiments is provided.

Modification Example 10: Modification Example of Reading Unit 105

For example, a reading unit 105 is not limited to a camera, but may be constituted of a scanner or the like, and read an identity verification document.

Further, for example, the reading unit 105 may be configured to further include an optical character reader (OCR) function. In this case, information for identifying a target person may be acquired from an image acquired by reading an identity verification document with use of the OCR function, in place of being input by a target person.

Further, for example, the reading unit 105 may be a reader for reading, from an integrated circuit (IC) chip, information held in the IC chip. In this case, an identity verification document may include an IC chip in which information including a read image M is held in advance, and the reading unit 105 may read the information from the IC chip of the identity verification document. Further, information for identifying a target person may be further held in the IC chip, and in this case, information for identifying a target person may be acquired by reading the information from the IC chip, in place of being input by the target person.

Further, in the drawings illustrating a flow used in the above description, a plurality of processes (pieces of processing) are described in order, but an order of execution of these processes is not limited to the order of description. The order of these processes may be changed within a range that does not adversely affect a content. Further, the above-described one example embodiment and modification examples may be combined, as far as contents do not conflict with each other.

One means or all means of the above-described example embodiments may also be described as the following supplementary notes, but is not limited to the following.

1. A person authentication support system including:
   a measurement condition acquisition means for acquiring a measurement condition of a depth in a measurement apparatus capable of generating image information indicating an image of a photographing region including a face of a target person, and depth information indicating a depth;
   a region setting means for setting a processing region being a region serving as a processing target of the depth information in the photographing region according to the measurement condition;
   a depth acquisition means for acquiring depth information including a depth in the processing region being measured in the measurement condition; and
   a collation determination means for determining whether image information of the target person is used in collation processing, based on depth information of the processing region.
2. The person authentication support system according to supplementary note 1, wherein
   the depth acquisition means acquires the depth information of the photographing region, in a case where brightness of an image indicated by the image information satisfies a predetermined illuminance criterion.
3. The person authentication support system according to supplementary note 1, wherein
   the depth acquisition means acquires the depth information of the photographing region, in a case where brightness to be measured by an illuminance sensor satisfies a predetermined illuminance criterion.
4. The person authentication support system according to supplementary note 2 or 3, wherein
   the illuminance criterion includes an upper limit and a lower limit of the brightness.
5. The person authentication support system according to any of supplementary notes 1 to 4, wherein
   the measurement condition is at least one of information for identifying a depth sensor for measuring the depth information, information for identifying an operating system running on the measurement apparatus, information for identifying an equipment loaded with the depth sensor, information for identifying an available API, and information for identifying an equipment to be adopted as the measurement apparatus.
6. The person authentication support system according to any of supplementary notes 1 to 5, wherein
   the region setting means includes
   an accuracy determination means for determining whether measurement accuracy of the depth is high accuracy, based on the measurement condition, and
   a setting means for setting a processing region narrower than that in a case where the measurement accuracy is not high accuracy, in a case where the measurement accuracy is high accuracy.
7. The person authentication support system according to supplementary note 6, wherein
   a processing region in a case where the measurement accuracy is high accuracy includes a region associated with a nose of the target person.
8. The Person Authentication Support System According to Supplementary Note 6 or 7, wherein
   the depth acquisition means acquires depth information of a processing region set by the setting means, and
   the collation determination means determines whether image information of the target person is used in collation processing, based on depth information acquired by the depth acquisition means.
9. The person authentication support system according to supplementary note 6 or 7, wherein
   the depth acquisition means acquires depth information of the photographing region, and
   the collation determination means includes
   an extraction means for extracting, from depth information acquired by the depth acquisition means, depth information of a processing region set by the setting means, and
   a determination means for determining whether image information of the target person is used in collation processing, based on depth information extracted by the extraction means.
10. The person authentication support system according to any of supplementary notes 1 to 9, wherein
   the collation determination means determines whether image information of the target person is used in collation processing by comparing an unevenness level indicating a magnitude of unevenness in the processing region with a predetermined unevenness criterion with use of depth information of the processing region.
11. A person authentication support apparatus including:
   a measurement apparatus capable of generating image information indicating an image of a photographing region including a face of a target person, and depth information indicating a depth;
   a measurement condition acquisition means for acquiring a measurement condition of a depth in the measurement apparatus;
   a region setting means for setting a processing region being a region serving as a processing target of the depth information in the photographing region according the measurement condition; and
   a collation determination means for determining whether image information of the target person is used in collation processing, based on depth information of the processing region.
12. A person authentication support method including, by a computer:
   acquiring a measurement condition of a depth in a measurement apparatus capable of generating image information indicating an image of a photographing region including a face of a target person, and depth information indicating a depth;

setting a processing region being a region serving as a processing target of the depth information in the photographing region according to the measurement condition;

acquiring depth information including a depth in the processing region being measured in the measurement condition; and determining whether image information of the target person is used in collation processing, based on depth information of the processing region.

13. A program for causing a computer to execute:

acquiring a measurement condition of a depth in a measurement apparatus capable of generating image information indicating an image of a photographing region including a face of a target person, and depth information indicating a depth;

setting a processing region being a region serving as a processing target of the depth information in the photographing region according to the measurement condition;

acquiring depth information including a depth in the processing region being measured in the measurement condition; and determining whether image information of the target person is used in collation processing, based on depth information of the processing region.

REFERENCE SIGNS LIST

100, 200, 300 Person authentication support system
101, 201 Measurement apparatus
102, 202, 302 Person authentication support apparatus
103 Input unit
104 Display unit
105 Reading unit
106 Depth measurement unit
107 Brightness measurement unit
108, 308 Communication unit
SA Photographing region
MP Measurement point
110 Read image acquisition unit
111 Image information acquisition unit
112 Measurement condition acquisition unit
113 Brightness acquisition unit
114 Data storage unit
114*a*, 114*b* Measurement condition versus accuracy data
115 Region setting unit
116 Depth acquisition unit
117 Collation determination unit
118 Authentication unit
120 Accuracy determination unit
121 Setting unit
130 Extraction unit
131 Determination unit
FR Face region
332 Server apparatus

What is claimed is:

1. A person authentication support system comprising:

at least one memory configured to store instructions; and at least one processor configured to execute the instructions to perform operations comprising:

acquiring a measurement condition of a depth in a measurement apparatus capable of generating image information indicating an image of a photographing region including a face of a target person, and depth information indicating a depth;

setting, in the photographing region, a processing region, which is a region serving as a processing target of the depth information, according to the measurement condition, wherein the processing region is a region where depth information is acquired;

acquiring depth information including a depth acquired in the processing region, which is measured in the measurement condition; and determining whether image information of the target person is used in collation processing, based on depth information of the set processing region.

2. The person authentication support system according to claim 1, wherein the acquiring depth information includes acquiring the depth information of the photographing region, in a case where brightness of an image indicated by the image information satisfies a predetermined illuminance criterion.

3. The person authentication support system according to claim 1, wherein the acquiring depth information includes acquiring the depth information of the photographing region, in a case where brightness to be measured by an illuminance sensor satisfies a predetermined illuminance criterion.

4. The person authentication support system according to claim 2, wherein the illuminance criterion includes an upper limit and a lower limit of the brightness.

5. The person authentication support system according to claim 1, wherein the measurement condition is at least one of information for identifying a depth sensor for measuring the depth information, information for identifying an operating system running on the measurement apparatus, information for identifying an equipment loaded with the depth sensor, information for identifying an available application programming interface (API), and information for identifying an equipment to be adopted as the measurement apparatus.

6. The person authentication support system according to claim 1, wherein the setting the processing region comprises:

determining whether measurement accuracy of the depth is high accuracy or low accuracy, based on the measurement condition; and setting, in a case where the measurement accuracy is high accuracy, the processing region narrower than that in a case where the measurement accuracy is low accuracy.

7. The person authentication support system according to claim 6, wherein a processing region in a case where the measurement accuracy is high accuracy includes a region associated with a nose of the target person.

8. The person authentication support system according to claim 6, wherein the acquiring depth information includes acquiring depth information of the set processing region, and wherein the determining whether image information of the target person is used in collation processing includes determining whether image information of the target person is used in collation processing, based on the acquired depth information.

9. The person authentication support system according to claim 6, wherein the acquiring depth information includes acquiring depth information of the photographing region, and wherein the determining whether image information of the target person is used in collation processing includes:

extracting, from the acquired depth information acquired, depth information of the set processing region set; and determining whether image information of the target person is used in collation processing, based on the extracted depth information.

10. The person authentication support system according to claim 1, wherein the determining whether image information of the target person is used in collation processing includes determining whether image information of the target person is used in collation processing by comparing an unevenness level indicating a magnitude of unevenness in the processing region with a predetermined unevenness criterion with use of depth information of the processing region.

11. A person authentication support method comprising, by a computer:

acquiring a measurement condition of a depth in a measurement apparatus capable of generating image information indicating an image of a photographing region including a face of a target person, and depth information indicating a depth;

setting, in the photographing region, a processing region, which is a region serving as a processing target of the depth information according to the measurement condition, wherein the processing region is a region where depth information is acquired;

acquiring depth information including a depth acquired in the processing region, which is measured in the measurement condition; and determining whether image information of the target person is used in collation processing, based on depth information of the set processing region.

12. A non-transitory storage medium storing a program for causing a computer to execute:

acquiring a measurement condition of a depth in a measurement apparatus capable of generating image information indicating an image of a photographing region including a face of a target person, and depth information indicating a depth;

setting, in the photographing region, a processing region, which is a region serving as a processing target of the depth information according to the measurement condition, wherein the processing region is a region where depth information is acquired;

acquiring depth information including a depth acquired in the processing region, which is measured in the measurement condition; and determining whether image information of the target person is used in collation processing, based on depth information of the set processing region.

* * * * *